(12) United States Patent
Sadowski

(10) Patent No.: US 12,438,345 B2
(45) Date of Patent: Oct. 7, 2025

(54) ELECTRICAL SYSTEM AND ELECTRICAL APPARATUS FOR BUS PLUGS WITH ROTARY HANDLE

(71) Applicant: ABB Schweiz AG, Baden (CH)

(72) Inventor: Mateusz Sadowski, Pierzchnica (PL)

(73) Assignee: ABB SCHWEIZ AG, Baden (CH)

( * ) Notice: Subject to any disclaimer, the term of this patent is extended or adjusted under 35 U.S.C. 154(b) by 315 days.

(21) Appl. No.: 17/993,927

(22) Filed: Nov. 24, 2022

(65) Prior Publication Data

US 2024/0178640 A1   May 30, 2024

(51) Int. Cl.
  *H02B 11/133* (2006.01)
  *H01H 9/20* (2006.01)
  *H02B 1/20* (2006.01)

(52) U.S. Cl.
  CPC ............ *H02B 11/133* (2013.01); *H01H 9/20* (2013.01); *H02B 1/20* (2013.01)

(58) Field of Classification Search
  CPC ...... F16B 7/00; F16C 1/00; F16C 1/12; F16C 1/14; F16C 1/145; H01H 31/00; H01H 31/04; H01H 31/06; H01H 9/20; G06F 1/181; E05C 17/04; E05C 19/06; E05C 3/042; H02B 13/00; H02B 13/02; H02B 1/00; H02B 1/01; H02B 1/015; H02B 1/20; H02B 1/26; H02B 1/052; H02B 1/0523; H02B 1/30; H02B 1/38; H02B 1/46; H02B 11/133; H02B 11/02; H02B 11/00; H02B 11/173; H02B 11/127; H02B 11/12; H02B 11/20; H02B 11/22; H02B 11/26
  USPC ...................................... 200/50.01
  See application file for complete search history.

(56) References Cited

U.S. PATENT DOCUMENTS

| | | | | |
|---|---|---|---|---|
| 8,307,545 | B1 * | 11/2012 | Ledbetter ................. | H02B 3/00 200/50.21 |
| 2009/0086414 | A1 * | 4/2009 | Yee ......................... | H02B 1/36 361/2 |

* cited by examiner

*Primary Examiner* — Anthony R Jimenez
(74) *Attorney, Agent, or Firm* — Leydig, Voit & Mayer, Ltd.

(57) ABSTRACT

The present disclosure provides an electrical system and an electrical apparatus including a flexible interlock mechanism. An electrical system to operate an electrical device in an enclosure includes an interlock mechanism, where the interlock mechanism includes an interlock slider for selectively engaging the enclosure with a busway structure; an actuating system on a door of the enclosure, where the actuating system includes a cam assembly that is configured to control the interlock mechanism; and a flexible mechanical interlock assembly that connects the cam assembly to the interlock mechanism, and where the flexible mechanical interlock assembly includes a push pull cable having a first end and a second end, where the first end of the push pull cable is connected to the cam assembly through a first connecting element, and where the second end of the push pull cable is connected to the interlock mechanism through a second connecting element.

20 Claims, 25 Drawing Sheets

ELECTRICAL SYSTEM AND ELECTRICAL APPARATUS FOR BUS PLUGS WITH ROTARY HANDLE

FIELD

Generally, the present disclosure relates to electrical systems and electrical apparatuses, and more particularly, to an electrical system and electrical apparatus including an interlock mechanism.

BACKGROUND

In electric power distribution, bus plugs are used to conduct electricity to power cables or cable buses while protecting them from over-currents or short circuits. Bus plugs include electrical systems and/or apparatuses. Such an electrical system or apparatus typically includes an enclosure for an electrical device with a door mounted rotary handle. The electrical system or apparatus can further include an actuating mechanism and an interlock mechanism, which connect to each other. With the rotary handle, the electrical device is operated in conjunction with the actuating mechanism as well as the interlock mechanism. However, problems arise when engaging the interlock mechanism to the rotary handle. Due to lack of flexibility, the electrical device needs to be modified in order to fit the interlock mechanism.

Therefore, there is a need to have an interlock mechanism that can be operated by a rotary handle regardless of a layout or a size of an electric device of an electrical system or apparatus. At the same time, there is a need to minimize the number of parts of the electrical system or apparatus.

SUMMARY

In an exemplary embodiment, the present disclosure provides an electrical system including a flexible interlock mechanism. The electrical system to operate an electrical device in an enclosure includes an interlock mechanism, wherein the interlock mechanism includes an interlock slider for selectively engaging the enclosure with a busway structure; an actuating system on a door of the enclosure, wherein the actuating system includes a cam assembly that is configured to control the interlock mechanism; and a flexible mechanical interlock assembly that connects the cam assembly to the interlock mechanism, and wherein the flexible mechanical interlock assembly includes a push pull cable having a first end and a second end, wherein the first end of the push pull cable is connected to the cam assembly through a first connecting element, and wherein the second end of the push pull cable is connected to the interlock mechanism through a second connecting element.

The electrical device in the enclosure includes a first shaft extending from the electrical device, and the electrical device is configured to be operated by a rotation of the first shaft, and wherein the electrical system further includes a handle disposed outside the enclosure and coupled to the electrical device with the door of the enclosure closed, and wherein the handle is operative to rotate the first shaft to turn the electrical device on based on that the handle reaches an on position, or to turn the electrical device off based on that the handle reaches an off position.

The cam assembly of the actuating system includes a first cam, and wherein the first cam is operable upon the rotation of the first shaft to displace the enclosure to engage with or disengage from the busway structure.

The first end of the push pull cable is connected to the first cam of the cam assembly through the first connecting element, and the second connecting element is connected to the interlock slider.

The push pull cable pulls the interlock slider to engage the enclosure with the busway structure based on that the handle rotates to the on position, and the push pull cable pushes the interlock slider to disengage the enclosure from the busway structure based on that the handle rotates to the off position.

The electrical device is tripped and the enclosure remains engaged with the busway structure based on that the handle rotates from the on position toward the off position, and stays between the on position and the off position.

The first end of the push pull cable is connected to the first cam of the cam assembly through the first connecting element, and wherein the flexible mechanical interlock assembly further includes a second cam; a second shaft having a first end and a second end; and an interlock cam that is connected to the interlock slider, and wherein the first end of the second shaft is connected to the second cam, and the second end of the second shaft is connected to the interlock cam, and wherein the second connecting element is connected to the second cam.

The push pull cable pulls the second connecting element, which causes a rotation of the second cam, the second shaft and the interlock cam in a counterclockwise direction by 30°, and a linear movement of the interlock slider to engage the enclosure with the busway structure based on that the handle rotates in a clockwise direction by 90° and reaches the on position, and the push pull cable pushes the second connecting element, which causes a rotation of the second cam, the second shaft and the interlock cam in a clockwise direction by 30°, and a linear movement of the interlock slider to disengage the enclosure from the busway structure based on that the handle rotates in a counterclockwise direction by 90° and reaches the off position.

The electrical device is tripped and the enclosure remains engaged with the busway structure based on that the handle rotates from the on position toward the off position, and stays between the on position and the off position.

In an exemplary embodiment, the present disclosure provides an electrical apparatus including a flexible interlock mechanism. The electrical apparatus includes one or two shafts. The electrical apparatus includes an enclosure, wherein the enclosure includes a door for an access to an interior of the enclosure; an electrical device, wherein the electrical device is located in the interior of the enclosure and includes a first shaft extending therefrom, and wherein the electrical device is configured to be operated by a rotation of the first shaft; a handle, wherein the handle is disposed outside the enclosure and coupled to the electrical device with the door of the enclosure closed, and wherein the handle is operative to rotate the first shaft to turn the electrical device on based on that the handle reaches an on position, or to turn the electrical device off based on that the handle reaches an off position; an interlock mechanism, wherein the interlock mechanism includes an interlock slider for selectively engaging the enclosure with a busway structure; an actuating system on the door of the enclosure, wherein the actuating system includes a cam assembly that is configured to control the interlock mechanism; and a flexible mechanical interlock assembly that connects the cam assembly to the interlock mechanism, and wherein the flexible mechanical interlock assembly includes a push pull cable having a first end and a second end, wherein the first end of the push pull cable is connected to the cam assembly through a first connecting element, and wherein the second end of the push pull cable is connected to the interlock mechanism through a second connecting element.

In an exemplary embodiment, the present disclosure further provides an electrical system including an interlock mechanism with one shaft or two shafts. The electrical system includes an enclosure, wherein the enclosure includes a door for an access to an interior of the enclosure; an electrical device, wherein the electrical device is located in the interior of the enclosure and includes a first shaft extending therefrom, and wherein the electrical device is configured to be operated by a rotation of the first shaft; a handle, wherein the handle is disposed outside the enclosure and coupled to the electrical device with the door of the enclosure closed, and wherein the handle is operative to rotate the first shaft to turn the electrical device on based on that the handle reaches an on position, or to turn the electrical device off based on that the handle reaches an off position; an interlock mechanism, wherein the interlock mechanism includes an interlock slider for selectively engaging the enclosure with a busway structure; an actuating system on the door of the enclosure, wherein the actuating system includes a cam assembly that is configured to control the interlock mechanism; and a flexible mechanical interlock assembly that connects the cam assembly to the interlock mechanism, and wherein the flexible mechanical interlock assembly includes a push pull cable having a first end and a second end, wherein the first end of the push pull cable is connected to the cam assembly through a first connecting element, and wherein the second end of the push pull cable is connected to the interlock mechanism through a second connecting element.

DETAILED DESCRIPTION

Exemplary embodiments of the present disclosure provide an electrical system and an electrical apparatus including a flexible interlock mechanism.

In industrial applications, electrical systems and electrical apparatuses are widely used for bus plugs, which distribute electric power, and safeguard operations as well. Generally, an electrical system or an electrical apparatus is equipped with an electrical device in an enclosure, an actuating mechanism, and an interlock mechanism. The electrical system or electrical apparatus is further equipped with a handle system, which provides access to and/or signals the status of the electrical device within the enclosure, and further, operates the interlock mechanism.

For some applications, a more flexible interlock mechanism allows the interlock mechanism to fit into the electrical system or electrical apparatus without modifications to the electrical device. At the same time, slimming down the structure of the electrical system or electrical apparatus is also desirable.

In one exemplary embodiment of the present disclosure, the electrical system includes one shaft, also known as a main shaft. The electrical device within the enclosure of the electrical system is configured to be turned ON or OFF by a rotation of the shaft, which is operated by a handle mounted on the door of the enclosure of the electrical system.

In one exemplary embodiment of the present disclosure, the electrical system includes two shafts, the main shaft and a second shaft, also known as a locking shaft. The locking shaft is located within the flexible interlock mechanism of the electrical system. A first end of the locking shaft is connected to a cam, also known as a main cam, of the actuating mechanism of the electrical system, and a second end of the locking shaft is connected to an interlock cam, which is connected to an interlock slider of the interlock mechanism.

For example, an electrical system to operate an electrical device in an enclosure includes an interlock mechanism, wherein the interlock mechanism includes an interlock slider for selectively engaging the enclosure with a busway structure; an actuating system on a door of the enclosure, wherein the actuating system includes a cam assembly that is configured to control the interlock mechanism; and a flexible mechanical interlock assembly that connects the cam assembly to the interlock mechanism, and wherein the flexible mechanical interlock assembly includes a push pull cable having a first end and a second end, wherein the first end of the push pull cable is connected to the cam assembly through a first connecting element, and wherein the second end of the push pull cable is connected to the interlock mechanism through a second connecting element.

Figure 1:
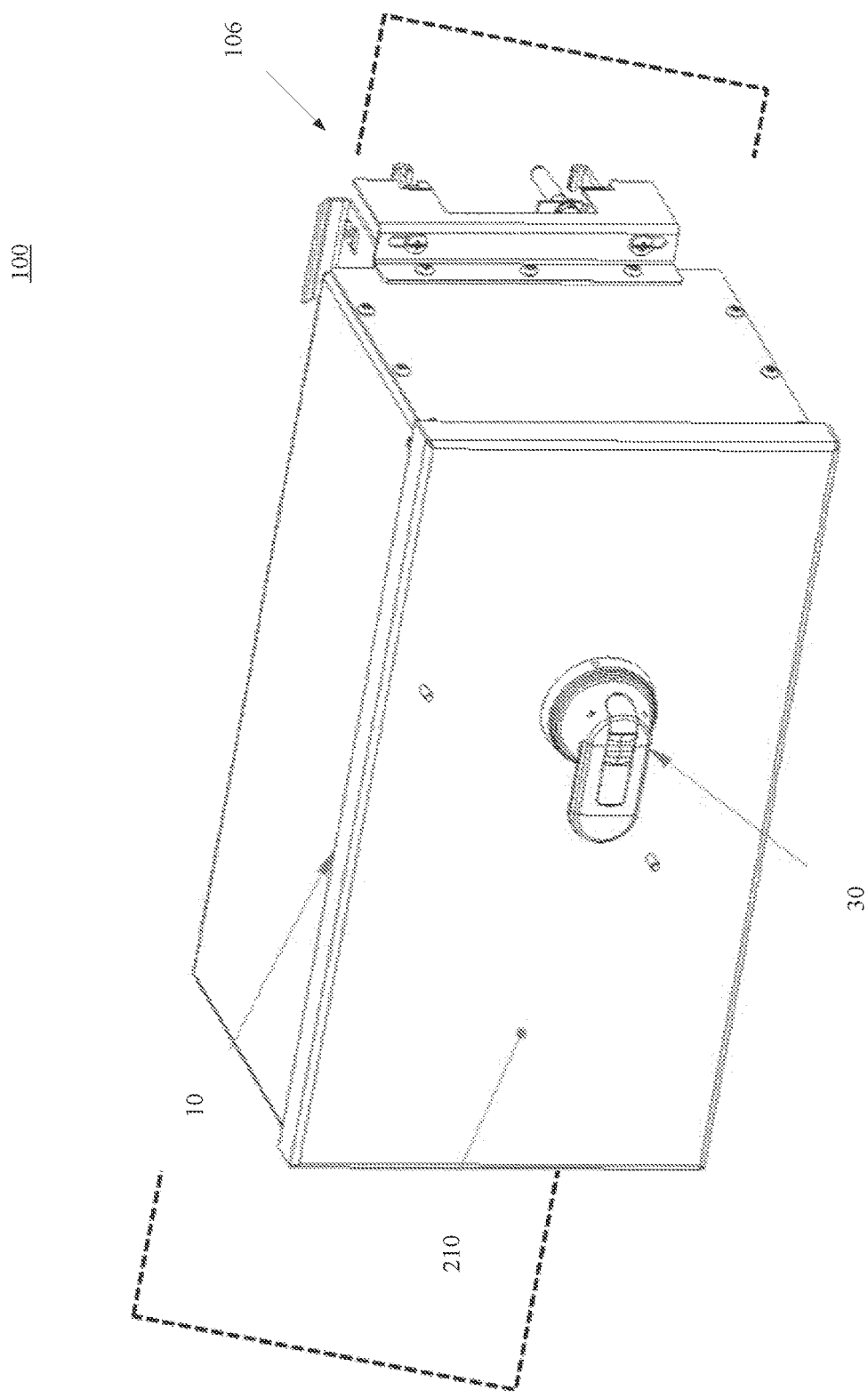
FIG. 1 is a front perspective view of an electrical system according to an exemplary embodiment of the present disclosure.

FIG. 1 is a front perspective view of an electrical system according to an exemplary embodiment of the present disclosure. As shown in FIG. 1, the electrical system includes an enclosure 210. A handle 30 is mounted on the door of the enclosure 210. The handle 30 may be a rotary handle. Additionally and/or alternatively, the handle 30 may be any suitable shape or configuration that is readily grasped by an operator for rotation. A busway tap-off device 10 is also shown in FIG. 1. The busway tap-off device 10 may be connected to a busway and/or a busway structure 106 as shown in FIG. 1 that is associated with the electrical system.

Figure 2:
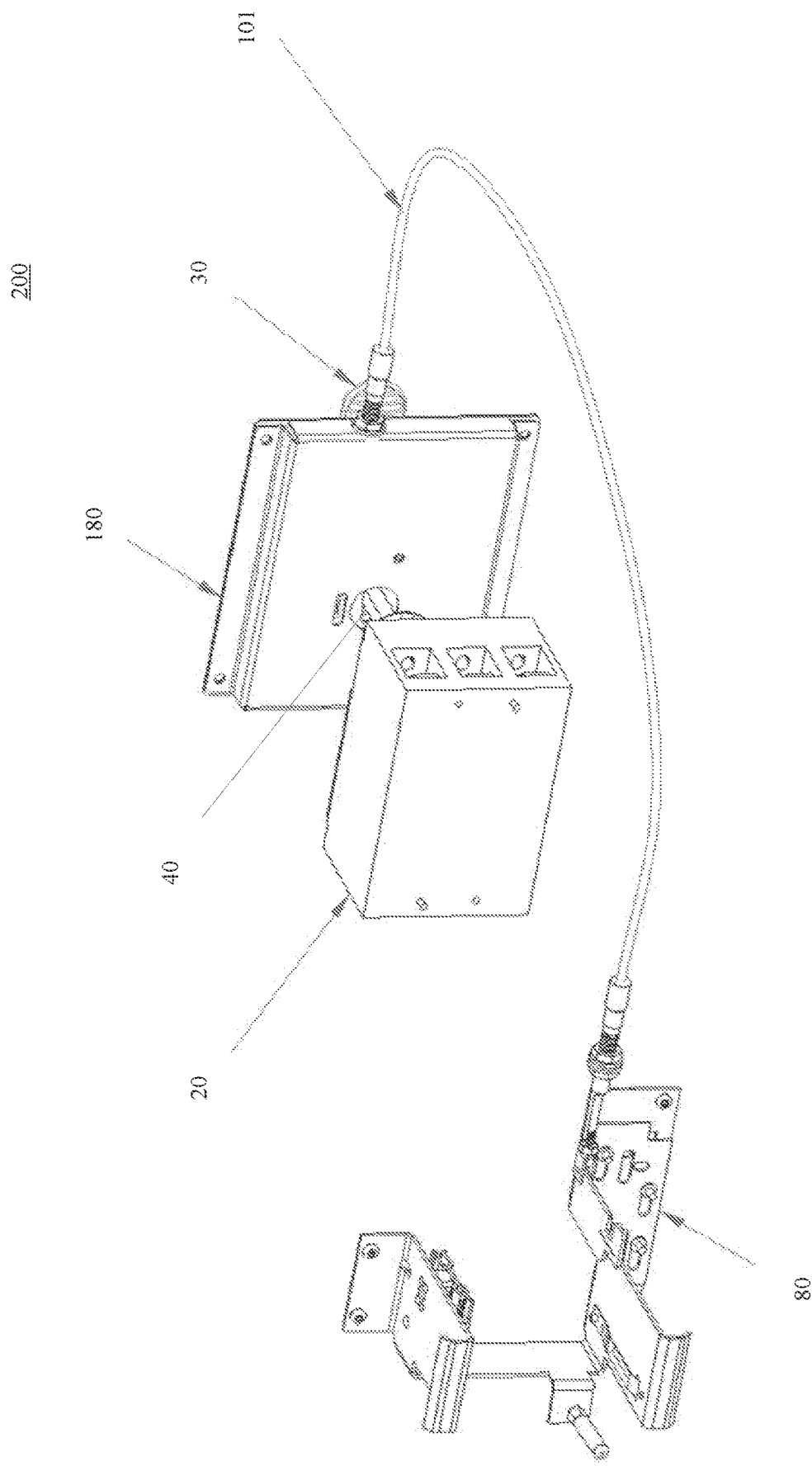
FIG. 2 is a partially exploded, rear perspective view of an electrical system without an enclosure according to an exemplary embodiment of the present disclosure.
Figure 4:
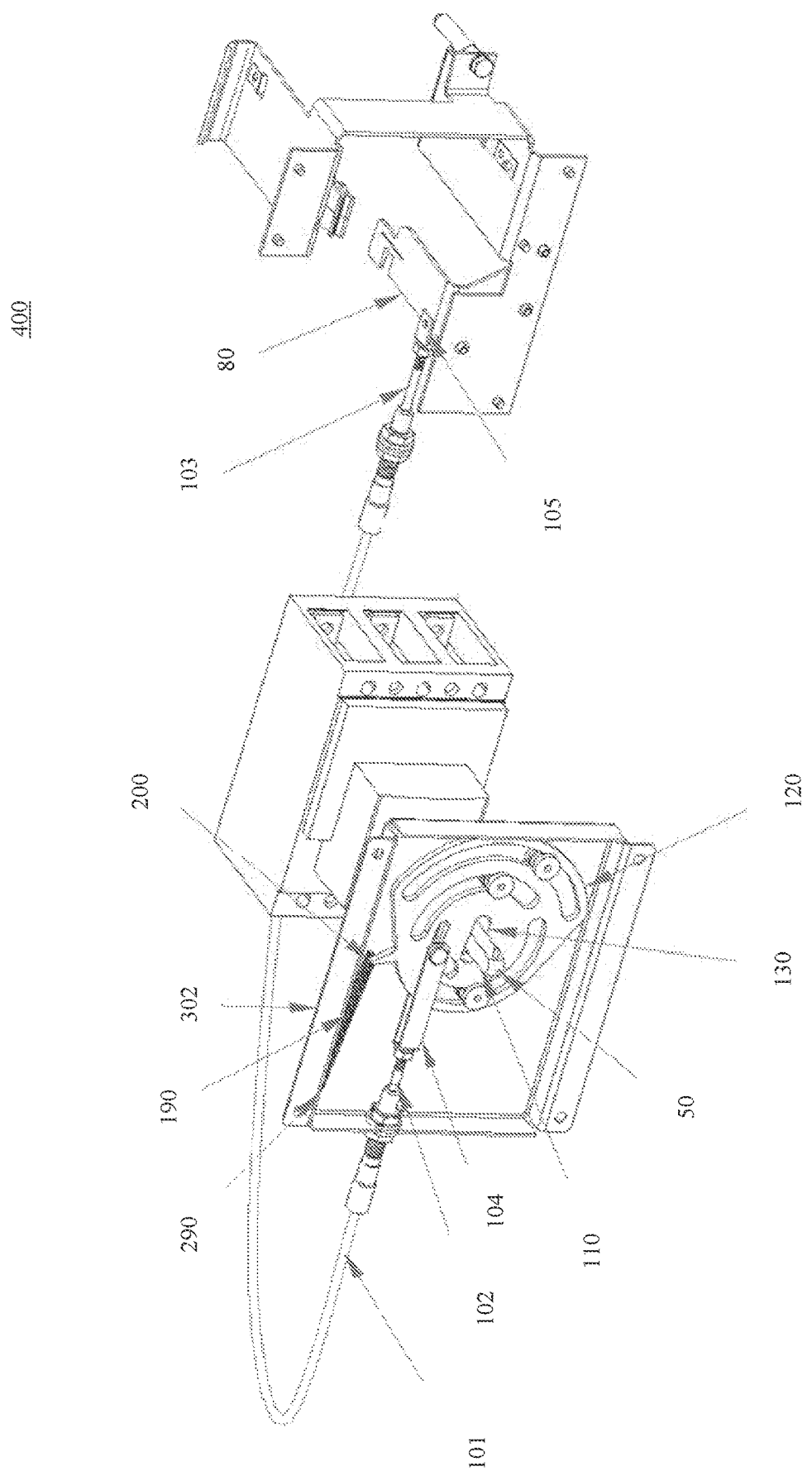
FIG. 4 is a partially exploded, front perspective view of an electrical system without an enclosure or a cover of the actuating mechanism according to an exemplary embodiment of the present disclosure.

FIG. 2 is a partially exploded, rear perspective view of an electrical system without an enclosure according to an exemplary embodiment of the present disclosure. As shown in FIG. 2, the electrical system further includes an actuating mechanism 180 on the door of the enclosure 210. As illustrated in FIG. 4, the actuating mechanism 180 may include a cam 120 and a spring 190. The actuating mechanism 180 may also include other parts. The electrical system further includes a push pull cable 101 that is connected to the actuating mechanism 180 and anchored to the enclosure 210. The push pull cable 101 may be a flexible Bowden cable. Additionally and/or alternatively, other types of cable may be also used. The electrical system further includes an interlock slider 80. The interlock slider 80 is a part of the interlock mechanism of the electrical system.

In some exemplary embodiments of the present disclosure, the interlock mechanism of the electrical system may be associated with an actuating mechanism 180, and/or the push pull cable 101, including the connecting elements 104 and 105 thereof as shown in the following FIG. 4. In some exemplary embodiments of the present disclosure, the interlock mechanism of the electrical system may further include the components that connect to the push pull cable 101 through the connecting elements 104 and 105, for example, a second cam 140, a locking shaft 150, an interlock cam 70, etc. as shown in the following FIGS. 14-16, which are also known as a flexible mechanical interlock assembly.

The interlock mechanism of the electrical system selectively engages the enclosure 210 to the busway and/or busway structure 106 as shown in FIG. 1. For example, by rotating the handle 30, the interlock mechanism of the electrical system reacts to engage or disengage with the busway and/or busway structure.

As shown, the electrical system also includes an electrical device 20. The electrical device 20 is arranged within the enclosure 210 of FIG. 1. The electrical device 20 is disposed between the actuating mechanism 180 and the interlock slider 80 of the interlock mechanism of the electrical system. The electrical device 20 may be any suitable electrical switching device that is capable of being toggled on and off. For example, the electrical device 20 may be a switch (for example, a fusible switch), circuit breaker, disconnector, or any other types of electric protective devices.

In some exemplary embodiments of the present disclosure, a shaft 40 extends from the electrical device 20 and operates the electrical device 20. For example, when the door of the enclosure 210 is closed, the handle 30 mounted on the door of the enclosure 210 is coupled to the electrical device 20 via the shaft 40. Then, operation of the handle 30 rotates the shaft 40 to turn the electrical device 20 ON or OFF.

Figure 3:
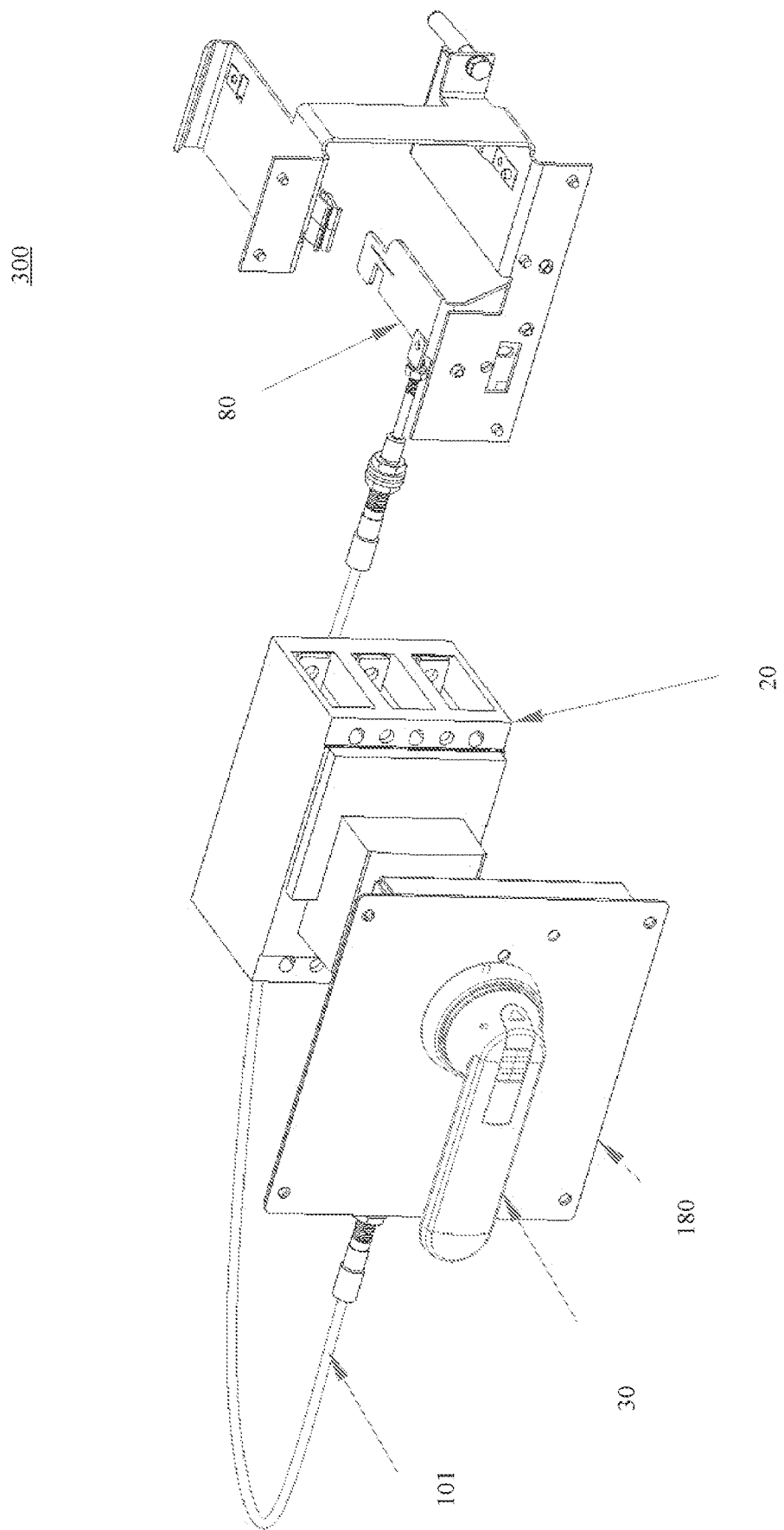
FIG. 3 is a partially exploded, front perspective view of an electrical system without an enclosure according to an exemplary embodiment of the present disclosure.

FIG. 3 is a partially exploded, front perspective view of an electrical system without an enclosure according to an exemplary embodiment of the present disclosure. As shown in FIG. 3, the actuating mechanism 180 is linked to the handle 30. The push pull cable 101, the electrical device 20 and the interlock slider 80 are also shown.

FIG. 4 is a partially exploded, front perspective view of an electrical system without an enclosure or a cover of the actuating mechanism according to an exemplary embodiment of the present disclosure. As shown in FIG. 4, there is a cam 120 inside the actuating mechanism 180. The cam 120 includes an opening 130. As shown, a first end 50 of the shaft 40 passes through the opening 130 of the cam 120. Further, a side surface 110 of the shaft 40 cooperates with the opening 130 of the cam 120.

In some exemplary embodiments of the present disclosure, the position of the first end 50 of the shaft 40 as shown in FIG. 4 may be regarded as an initial state of the busway tap-off device 10 of the electrical system with one shaft. That is, the busway tap-off device 10 is in the OFF (OPEN) position.

As shown, the cam 120 is moveably connected to a first end 102 of the push pull cable 101 by a connecting element 104. Further, a second end 103 of the push pull cable 101 is connected to the interlock slider 80 of the interlock mechanism of the electrical system by a connecting element 105. As such, the cam 120 is also moveably connected to the interlock mechanism of the electrical system. As shown, there is also a spring 190 inside the actuating mechanism 180. The spring 190 is located close to edges of an actuating mechanism enclosure 302 for the actuating mechanism 180. Connecting elements 200 and 290 inside the actuating mechanism enclosure 302 respectively fix the spring 190 at each end. The spring 190 may be a Torsion spring or a mainspring. Additionally and/or alternatively, the spring 190 may be other types of spring. Additionally and/or alternatively, the spring 190 may be fixed in different locations within the enclosure 210, as shown in FIG. 1.

Figure 5:
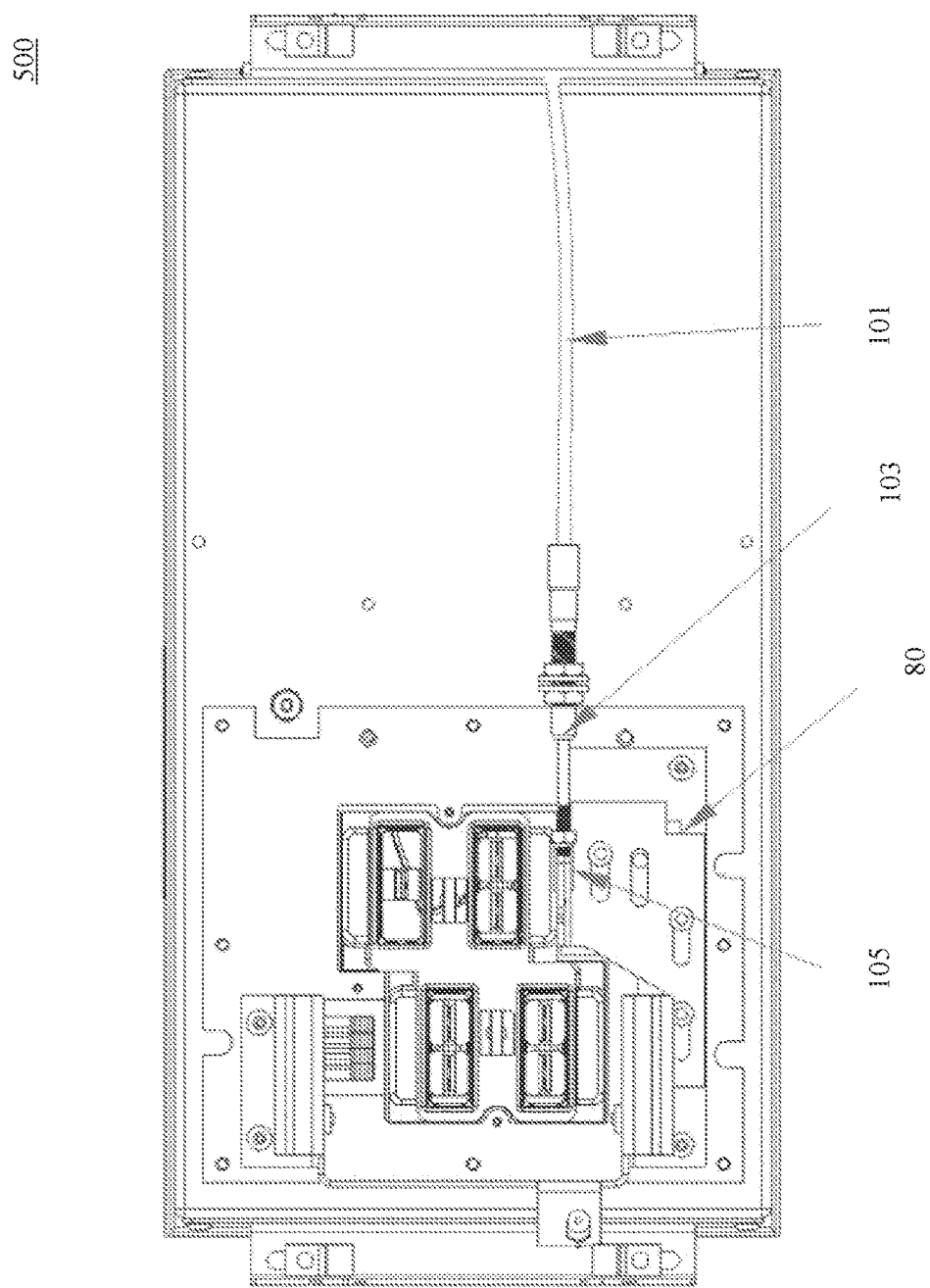
FIG. 5 is a rear view of a busway tap-off device of an electrical system in the OFF (OPEN) position according to an exemplary embodiment of the present disclosure.

FIG. 5 is a rear view of a busway tap-off device of an electrical system in the OFF (OPEN) position according to an exemplary embodiment of the present disclosure. As shown in FIG. 5, the detailed connection by the connecting element 105 between the second end 103 of the push pull cable 101 and the interlock slider 80 of the interlock mechanism of the electrical system is depicted, when the busway tap-off device 10 of the electrical system is in the OFF (OPEN) position.

Figure 6:
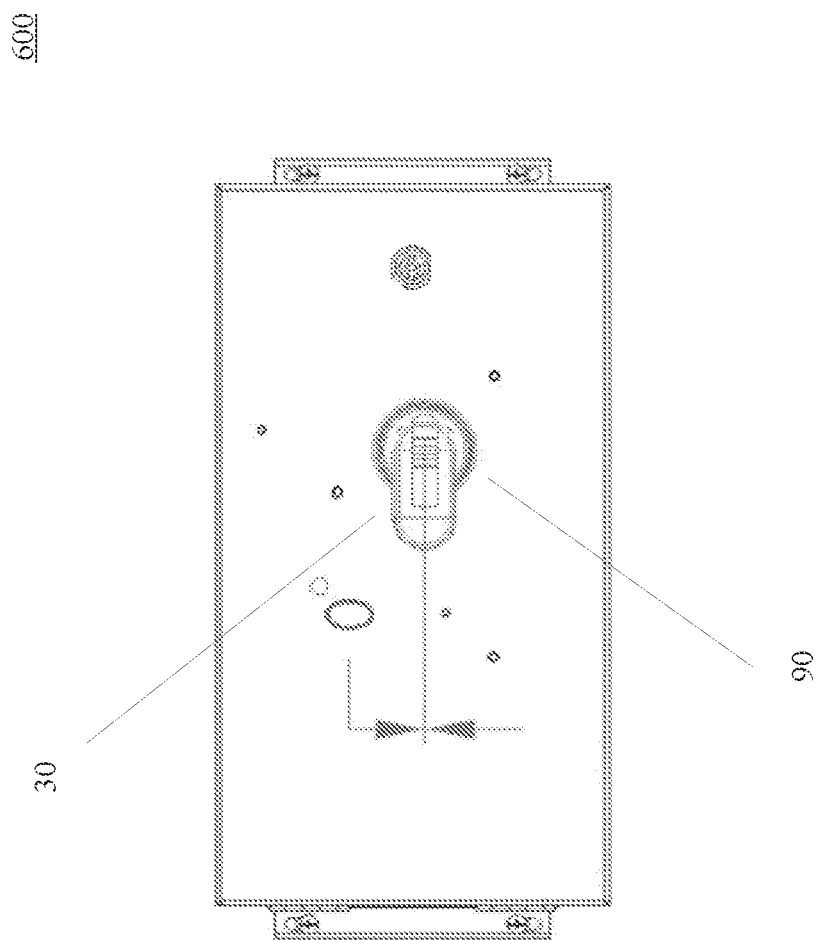
FIG. 6 is a front view of a busway tap-off device of an electrical system in the OFF (OPEN) position according to an exemplary embodiment of the present disclosure.

FIG. 6 is a front view of a busway tap-off device of an electrical system in the OFF (OPEN) position according to an exemplary embodiment of the present disclosure. As shown in FIG. 6, the handle 30 is in a first position 90, that is, the handle 30 is oriented horizontally, or parallel to a horizontal axis. In order to switch off the busway tap-off device 10 of the electrical system, namely, putting the busway tap-off device 10 of the electrical system in the OFF (OPEN) position, i.e., in the first position 90, the handle 30 is rotated in a counterclockwise direction by 90°, until the handle 30 is positioned, in this case, at 0° relative to the horizontal axis.

With reference to FIG. 4, during this process, the shaft 40 rotates together with the rotation of the handle 30. That is, once the handle 30 rotates by 90°, the shaft 40 rotates accordingly by 90° as well. As such, the shaft 40 turns the electrical device 20 to the OFF (OPEN) position, namely, the first position 90 as shown in FIG. 6. Further, the shaft 40 also operates the cam 120 inside the actuating mechanism 180. For example, once the operator rotates the handle 30 by 90°, the cam 120 rotates accordingly by 90° as well. The movement of the cam 120 causes the spring 190 to return to its original state (not tensioned). That is, once the cam 120 rotates counterclockwise together with the shaft 40 by 90°, the push pull cable 101 pushes the interlock slider 80 into the UNLOCKED position.

As such, the switch-off process is completed. Then, the busway tap-off device 10 can be removed from the busway and/or busway structure. As discussed above, the spring 190 will not be tensioned until the electrical device 20 is put back in the ON (CLOSED) position.

Figure 7:
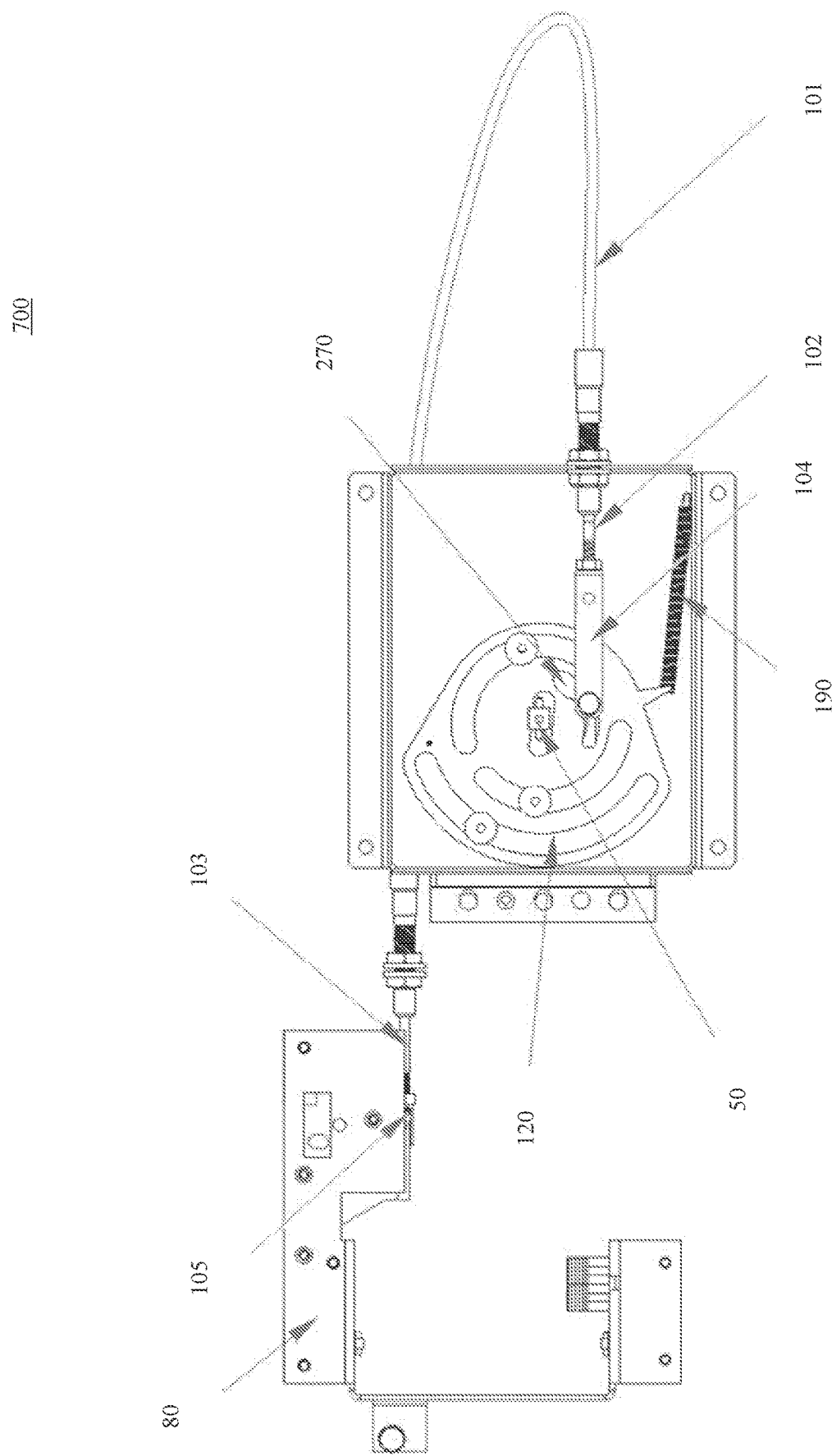
FIG. 7 is a front view of an actuating mechanism of an electrical system without a cover mounted on the busway tap-off device, with the tap-off device in the OFF (OPEN) position according to an exemplary embodiment of the present disclosure.

FIG. 7 is a front view of an actuating mechanism of an electrical system without a cover mounted on the busway tap-off device, with the tap-off device in the OFF (OPEN) position according to an exemplary embodiment of the present disclosure. As shown in FIG. 7, the cam 120 inside the actuating mechanism 180 includes a slot 270. As shown, the connection through the connecting element 104 between the first end 102 of the push pull cable 101 and the cam 120 is made by the slot 270.

As further shown in FIG. 7, and with reference to FIG. 4, the first end 50 of the shaft 40 that passes through the opening 130 of the cam 120 is in a position in accordance with the handle 30's position, namely, the first position 90 as shown in FIG. 6.

Figure 8:
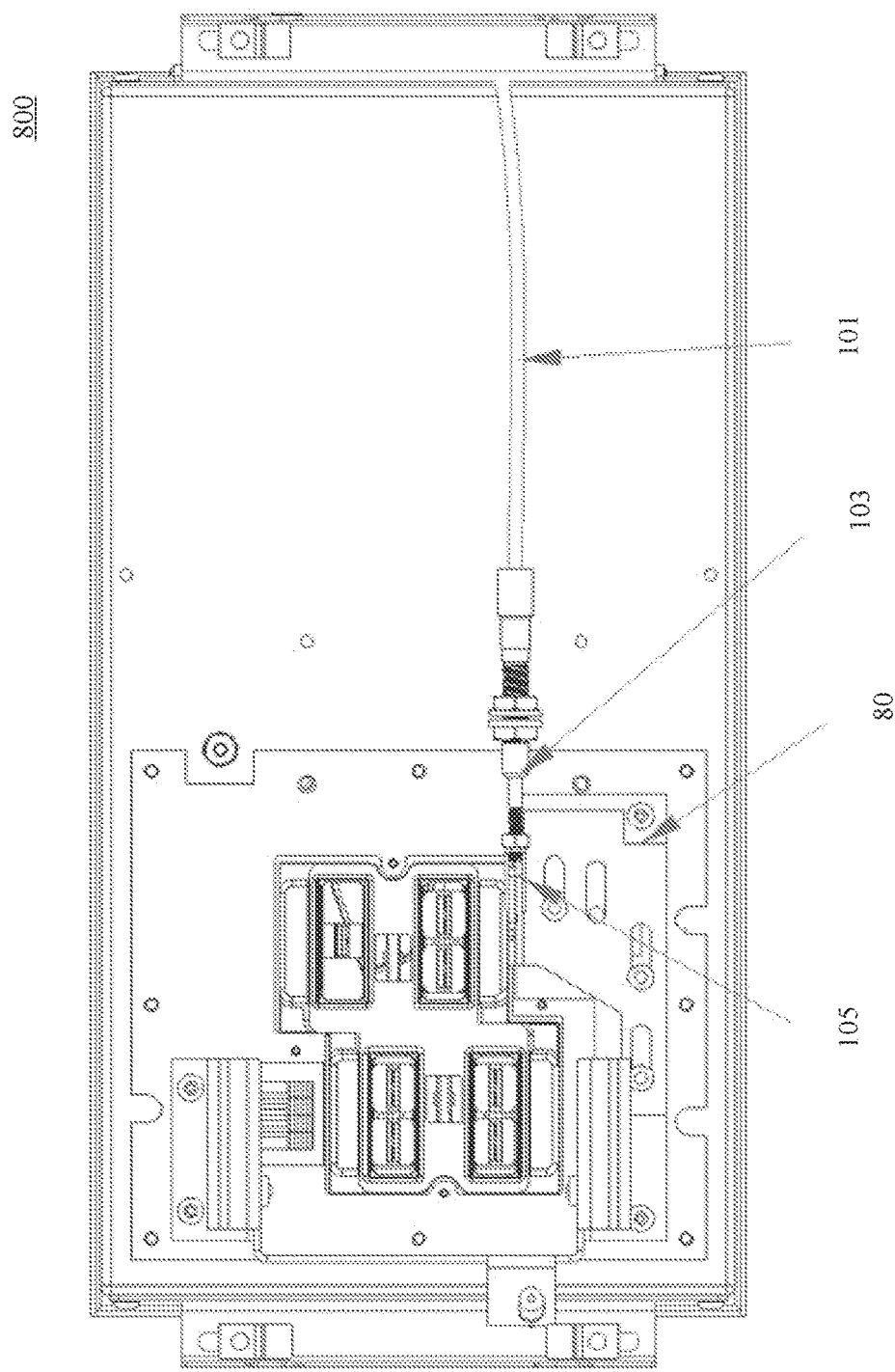
FIG. 8 is a rear view of a busway tap-off device of an electrical system in the ON (CLOSED) position according to an exemplary embodiment of the present disclosure.

FIG. 8 is a rear view of a busway tap-off device of an electrical system in the ON (CLOSED) position according to an exemplary embodiment of the present disclosure. As shown in FIG. 8, the detailed connection by the connecting element 105 between the second end 103 of the push pull cable 101 and the interlock slider 80 of the interlock mechanism of the electrical system is depicted, when the busway tap-off device 10 of the electrical system is in the ON (CLOSED) position.

Figure 9:
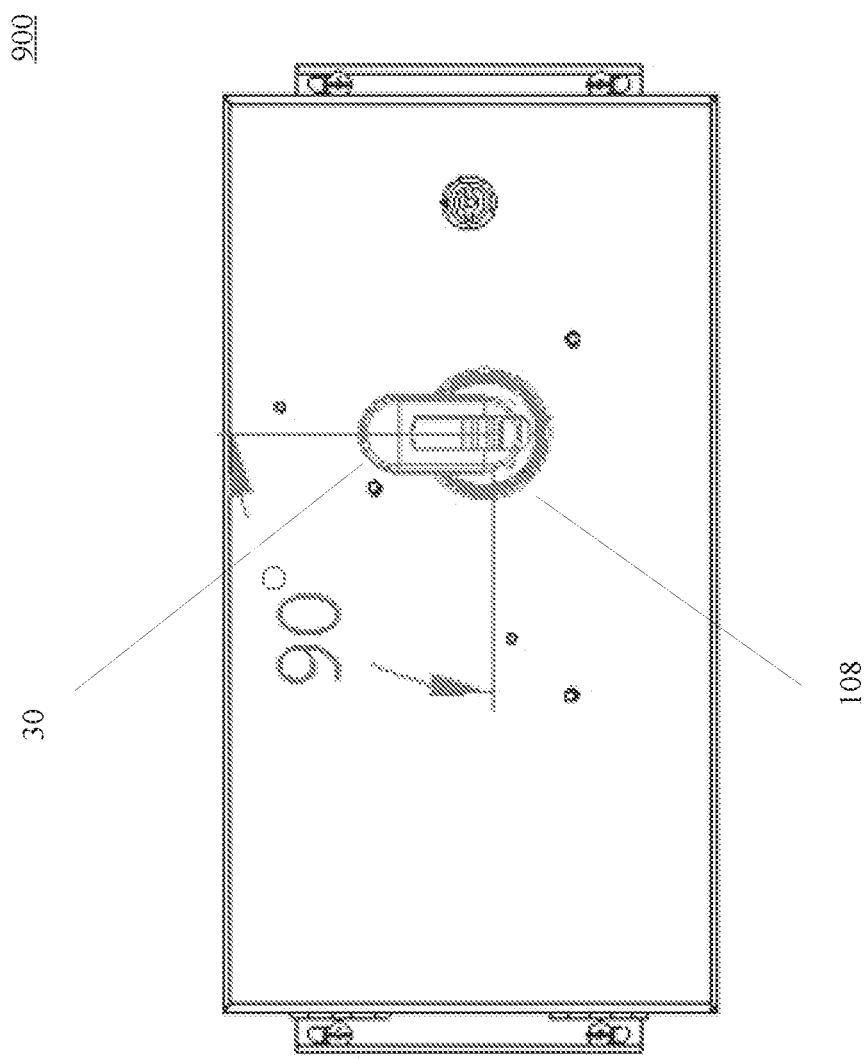
FIG. 9 is a front view of a busway tap-off device of an electrical system in the ON (CLOSED) position according to an exemplary embodiment of the present disclosure.

FIG. 9 is a front view of a busway tap-off device of an electrical system in the ON (CLOSED) position according to an exemplary embodiment of the present disclosure. As shown in FIG. 9, the handle 30 is in a second position 108, that is, the handle 30 is oriented vertically, or parallel to the vertical axis. In order to switch on the busway tap-off device 10, namely, putting the busway tap-off device 10 in the ON (CLOSED) position, i.e., the second position 108, the handle 30 is rotated by 90°, in a clockwise direction, until the handle 30 is positioned, in this case, at 0° relative to the vertical axis. For example, the handle 30 is rotated from the first position 90 as shown in FIG. 6, along or in parallel to the horizontal axis, to the second position 108 as shown in FIG. 9, along or in parallel to the vertical axis.

Thus, an operator may rotate the handle 30 to switch on or switch off the busway tap-off device 10 of the electrical system, for example, by rotating or operating the handle 30 by 90°, clockwise or counterclockwise.

As shown in FIG. 9, and with reference to FIGS. 4 and 7, during the switching-on process, the operator rotates the handle 30 clockwise by 90°, until the handle 30 reaches the second position 108. Based on the connection between the handle 30 and the first end 50 of the shaft 40, the shaft 40 rotates by 90° as well. Accordingly, the shaft 40 turns the electrical device 20 to the ON (CLOSED) position. Further, the side surface 110 of the shaft 40 cooperates with the opening 130 of the cam 120 inside the actuating mechanism 180. As such, once the operator rotates the handle 30, the cam 120 rotates with the handle 30 as well, for example, by 90°. This movement of the cam 120 tensions the spring 190.

Furthermore, based on the moveable connection by the connecting element 104 between the slot 270 of the cam 120 and the first end 102 of the push pull cable 101, the movement of the cam 120 causes a reciprocating movement of the connecting element 104. This reciprocating movement of the connecting element 104 transforms into a pulling force on the first end 102 of the push pull cable 101.

Furthermore, based on the moveable connection by the connecting element 105 between the second end 103 of the push pull cable 101 and the interlock slider 80 of the interlock mechanism of the electrical system, the push pull cable 101 pulls the connecting element 105, and accordingly, the connecting element 105 pulls the interlock slider 80. For example, when the cam 120 rotates clockwise together with the shaft 40 by 90°, the push pull cable 101 pulls the connecting element 105, and then, indirectly pulls the interlock slider 80. With this pulling force, the interlock slider 80 moves forward and interlocks with a slot on the busway and/or busway structure, namely, in a LOCKED position.

As such, the switching-on process is completed. In this situation, the busway tap-off device 10 cannot be removed from the busway and/or busway structure until the electrical device 20 is put back. As discussed above, the spring 190 will be tensioned until the electrical device 20 is put back in the OFF (OPEN) position.

Figure 10:
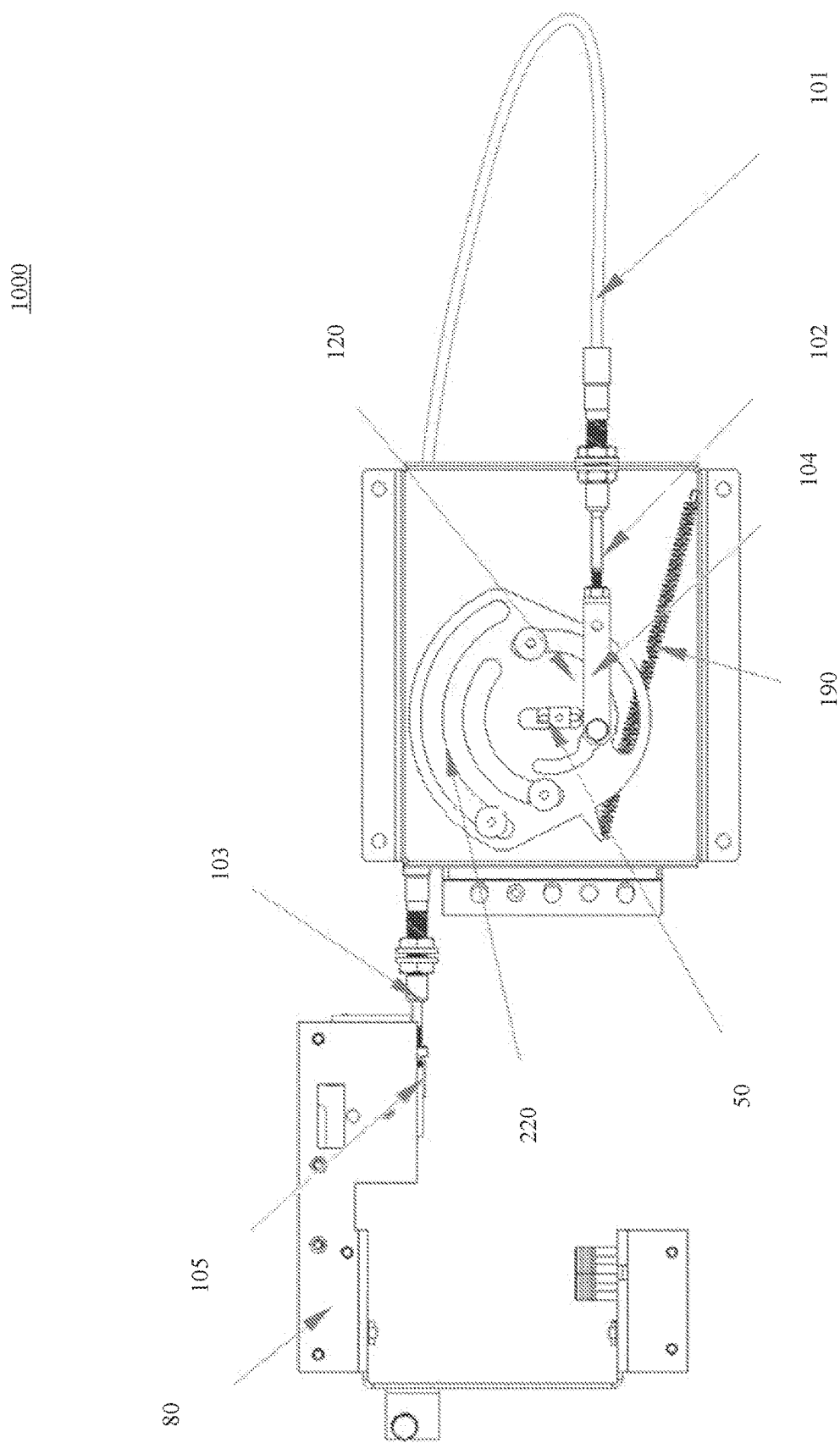
FIG. 10 is a front view of an actuating mechanism of an electrical system without a cover mounted on the busway tap-off device of the electrical system, with the tap-off device in the ON (CLOSED) position according to an exemplary embodiment of the present disclosure.

FIG. 10 is a front view of an actuating mechanism of an electrical system without a cover mounted on the busway tap-off device of the electrical system, with the tap-off device in the ON (CLOSED) position according to an exemplary embodiment of the present disclosure. As shown in FIG. 10, and with reference to FIG. 4, the first end 50 of the shaft 40 that passes through the opening 130 of the cam 120 is in a position in accordance with the handle 30's position, namely, the second position 108 as shown in FIG. 9.

Figure 11:
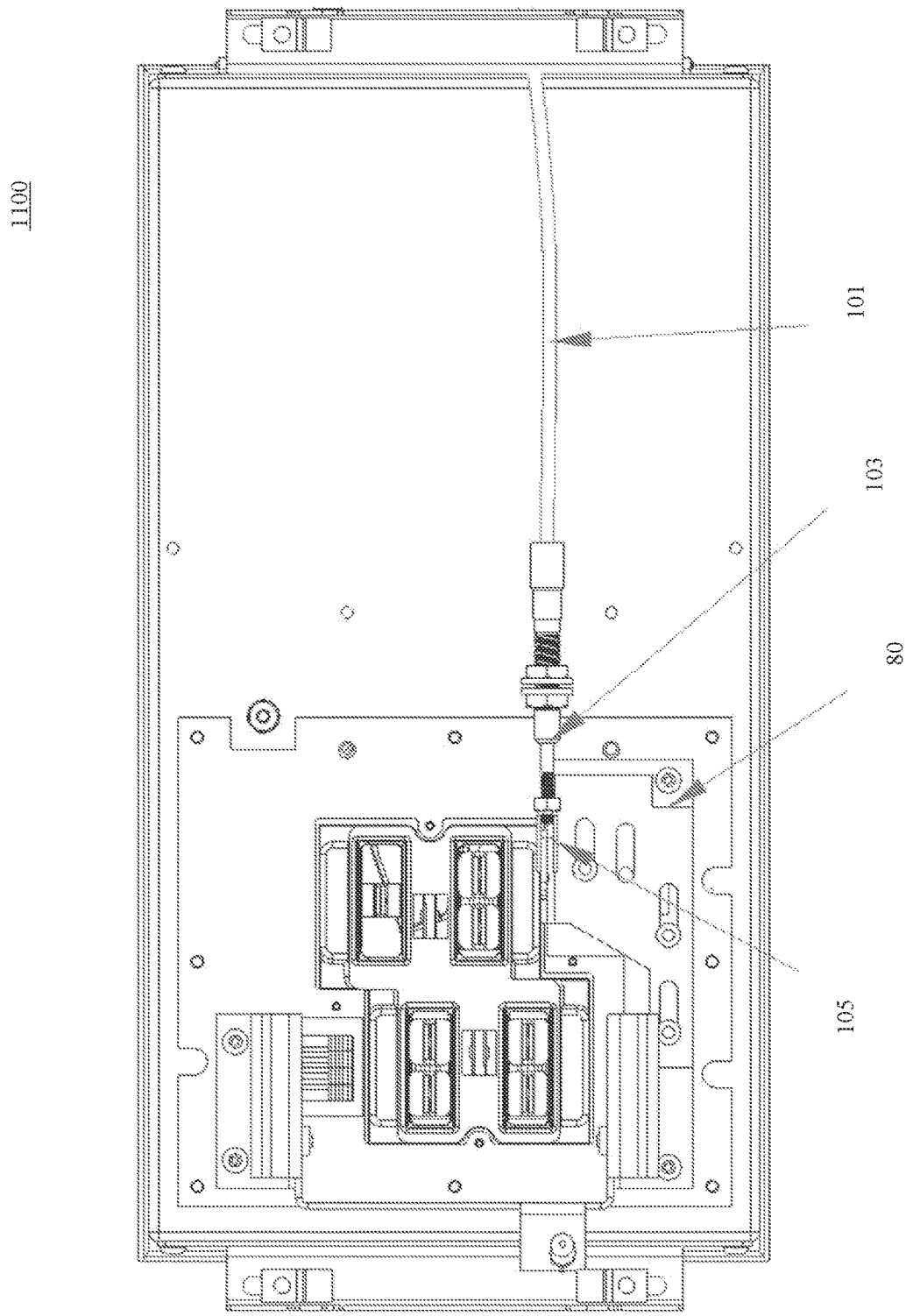
FIG. 11 is a rear view of a busway tap-off device of an electrical system in the TRIPPED position according to an exemplary embodiment of the present disclosure.

FIG. 11 is a rear view of a busway tap-off device of an electrical system in the TRIPPED position according to an exemplary embodiment of the present disclosure. As shown in FIG. 11, the detailed connection by the connecting element 105 between the second end 103 of the push pull cable 101 and the interlock slider 80 of the interlock mechanism of the electrical system is depicted, when the busway tap-off device 10 of the electrical system is in the TRIPPED position.

Figure 12:
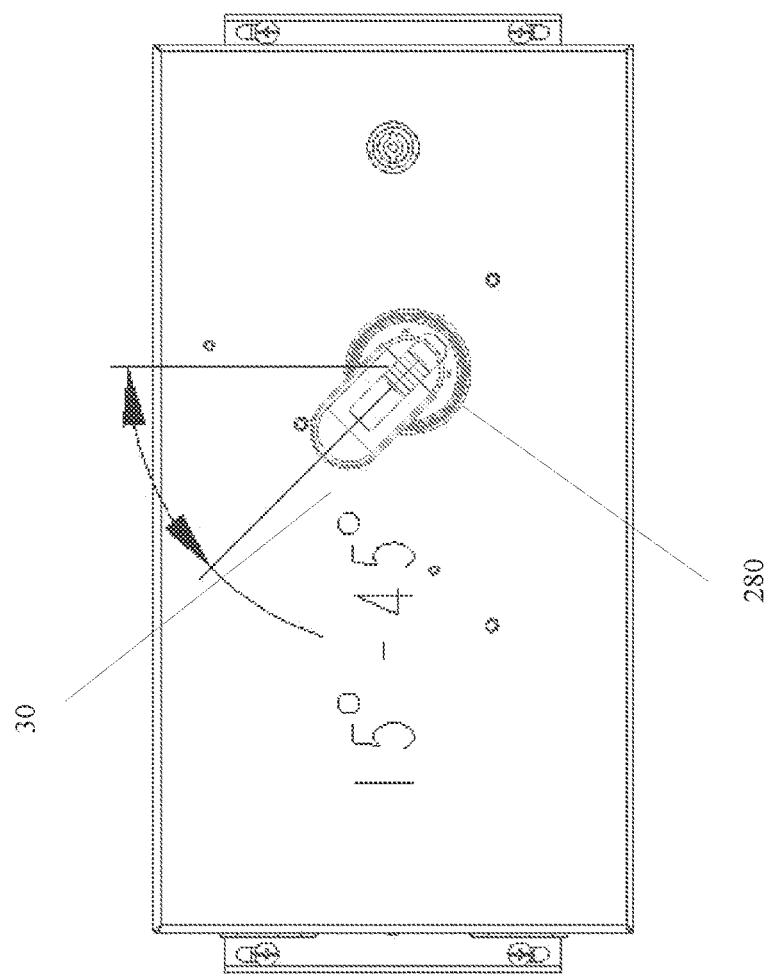
FIG. 12 is a front view of a busway tap-off device of an electrical system in the TRIPPED position according to an exemplary embodiment of the present disclosure.

FIG. 12 is a front view of a busway tap-off device of an electrical system in the TRIPPED position according to an exemplary embodiment of the present disclosure. As shown in FIG. 12, the handle 30 is in a third position 280, that is, the handle 30 is between 15° and 45° relative to the vertical axis. For example, the handle 30 is rotated, in a counterclockwise direction, from the second position 108 as shown in FIG. 9, along or in parallel to the vertical axis, to the third position 280 as shown in FIG. 12, 15°-45° away from the vertical axis.

This may happen when there is a short circuit and/or an overcurrent within the electrical system. That is, the busway tap-off device 10 of the electrical system is triggered to go to the TRIPPED position upon an event of short circuit and/or an overcurrent within the electrical system. In that situation, the electrical system is in the OFF state and does not conduct electricity. While the busway tap-off device 10 of the electrical system is in the TRIPPED position, it must be re-set, and then, put back in the OFF (OPEN) position. From the OFF (OPEN) position, the busway tap-off device 10 of the electrical system can be turned to the ON (CLOSED) position.

As shown in FIG. 12, and with reference to FIGS. 4 and 10, the busway tap-off device 10 of the electrical system is triggered into the TRIPPED position from the ON (CLOSED) position in the event that a short circuit and/or an overcurrent within the electrical system happens. In this situation, this triggered movement of the busway tap-off device 10 will rotate the cam 120 inside the actuating mechanism 180, which then rotates the draft 40 as well as the handle 30. For example, the energy accumulated in the spring 190 fights the friction between all the moveable elements within the electrical system, such as, the internal friction of the handle 30, the internal friction of the actuating mechanism 180, the internal friction of the interlock slider 80, etc. This accumulated energy in the spring 190 also ensures that the handle 30 can rotate by up to a maximal angle. Accordingly, the state of the electrical device 20 will be clearly indicated in the TRIPPED position. In this situation, the spring 190 is partially tensioned until the electrical device 20 is put back in the OFF (OPEN) position.

Further, the slot 270 of the cam 120 is shaped to move the first end 102 of the push pull cable 101 when the electrical device 20 is switched on or off. The slot 270 of the cam 120, however, is shaped not to move the first end 102 of the push pull cable 101 when the electrical device 20 is tripped. Accordingly, the rotation of the shaft 40 counterclockwise by 15°-45° does not move the interlock slider 80 of the interlock mechanism, based on the connection through the connecting element 104 between the first end 102 of the push pull cable 101 and the cam 120 that is made by the slot 270.

As such, the process of putting the busway tap-off device 10 of the electrical system in the TRIPPED position from the ON (CLOSED) position is completed. In this situation, the electrical system provides a trip signalization, i.e., the electrical device 20 of the electrical system is tripped. As discussed above, the spring 190 remains partially tensioned.

Figure 13:
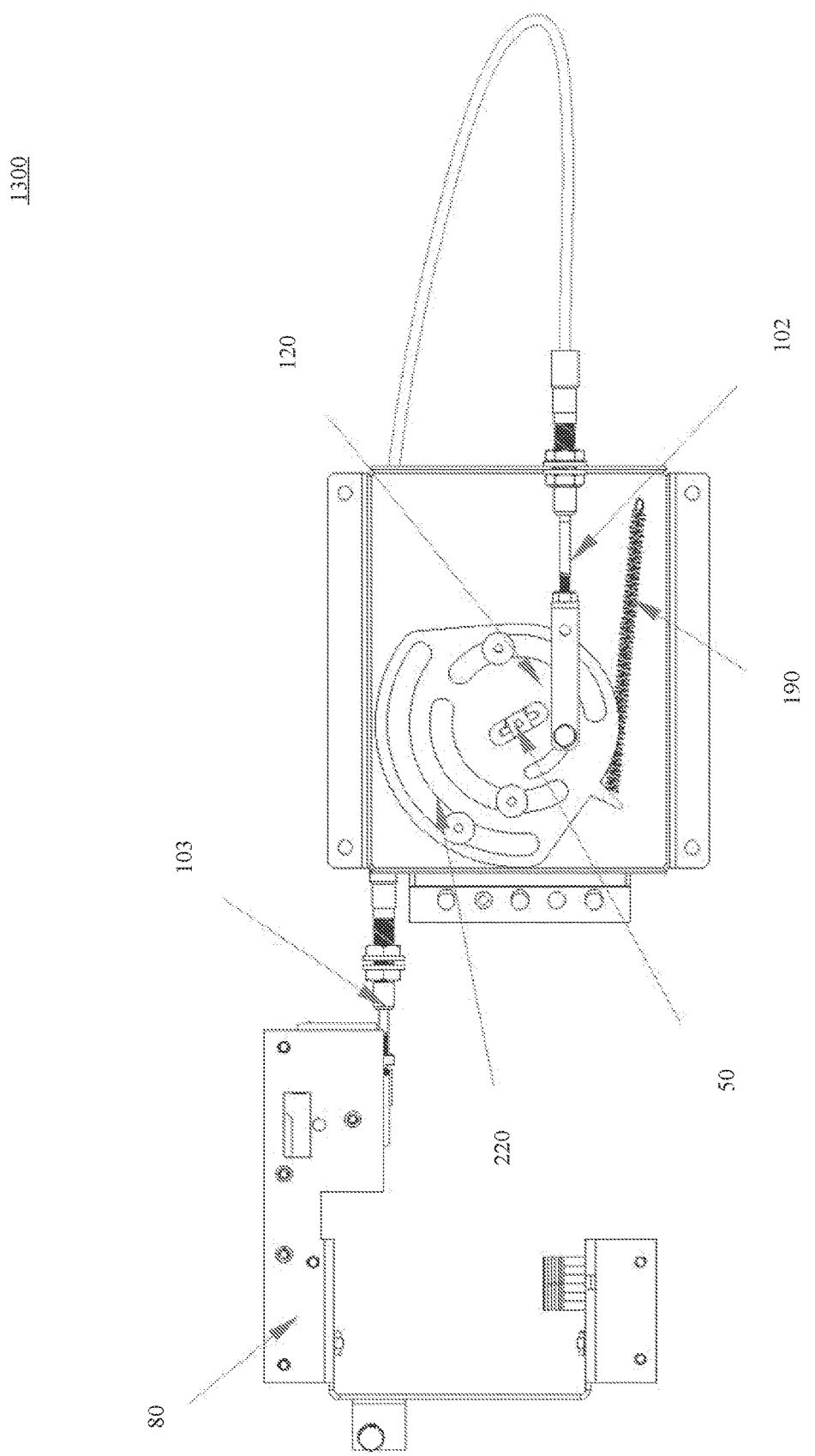
FIG. 13 is a front view of an actuating mechanism of an electrical system without a cover mounted on the busway tap-off device of the electrical system, with the tap-off device in the TRIPPED position according to an exemplary embodiment of the present disclosure.

FIG. 13 is a front view of an actuating mechanism of an electrical system without a cover mounted on the busway tap-off device of the electrical system, with the tap-off device in the TRIPPED position according to an exemplary embodiment of the present disclosure. As shown in FIG. 13, and with reference to FIG. 4, the first end 50 of the shaft 40 that passes through the opening 130 of the cam 120 is in a position in accordance with the handle 30's position, namely, in the third position 280 as shown in FIG. 12.

Figure 14:
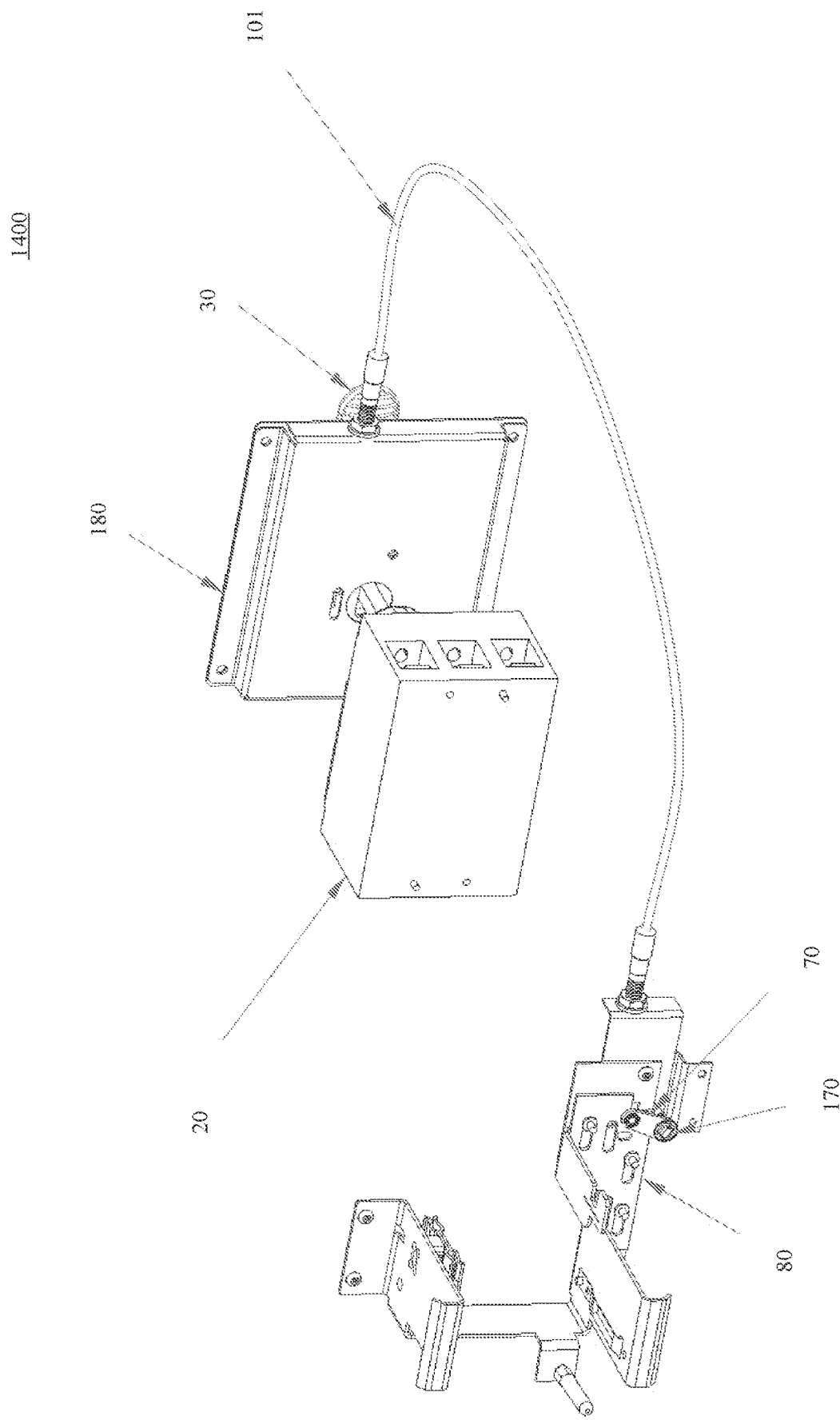
FIG. 14 is a partially exploded, rear perspective view of an electrical system without an enclosure according to an exemplary embodiment of the present disclosure.

FIG. 14 is a partially exploded, rear perspective view of an electrical system without an enclosure according to an exemplary embodiment of the present disclosure. The electrical system includes a second shaft, i.e., a locking shaft 150, as shown in the following FIGS. 15 and 16. The locking shaft 150 is located within the interlock mechanism of the electrical system. The locking shaft 150 includes a first end 160 and a second end 170. As shown in FIG. 14, the interlock mechanism further includes an interlock cam 70. For example, on the second end 170 of the locking shaft 150, the locking shaft 150 is equipped with the interlock cam 70. Further, the interlock cam 70 is connected to the interlock slider 80 of the interlock mechanism.

Figure 15:
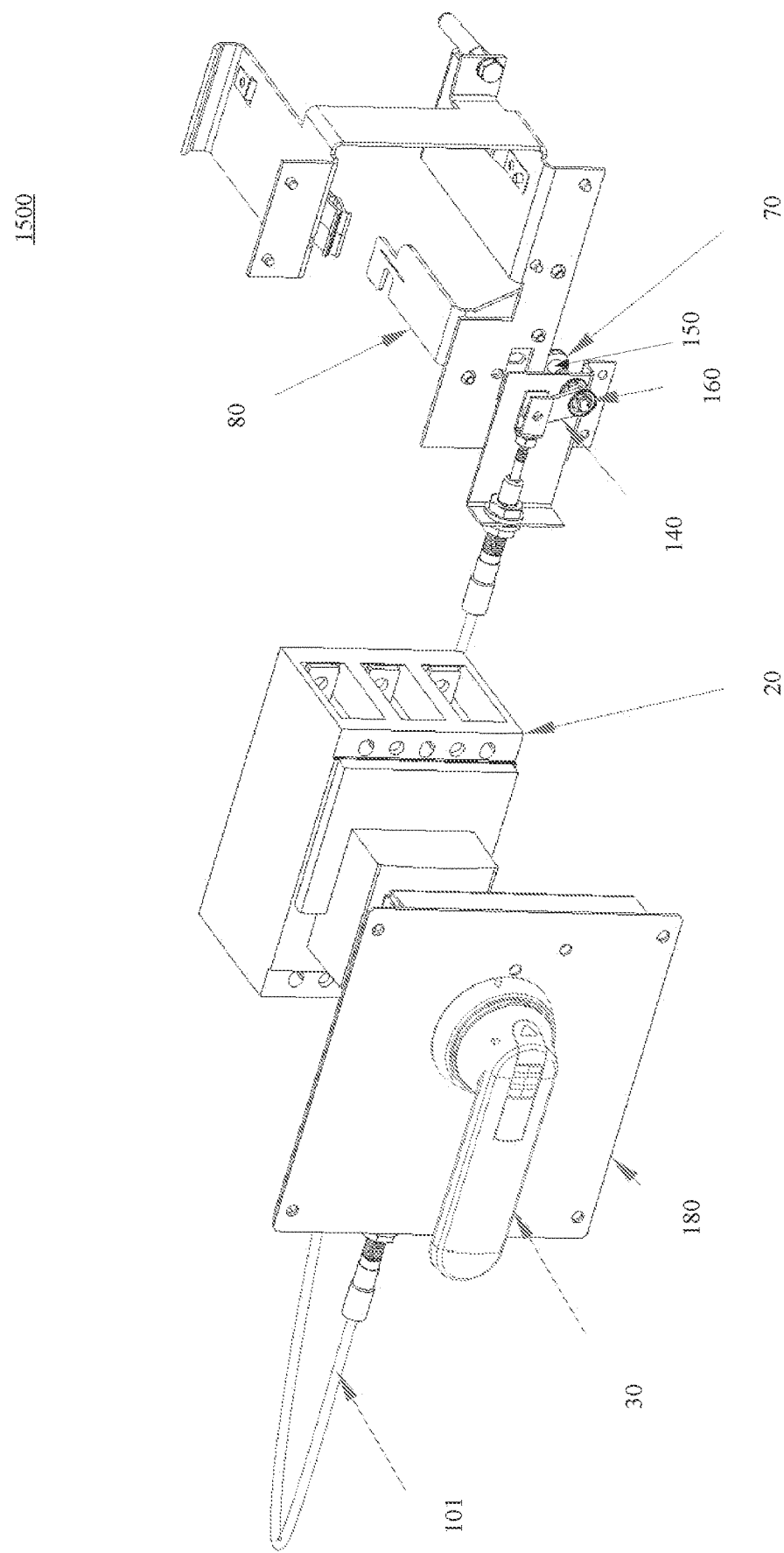
FIG. 15 is a partially exploded, front perspective view of an electrical system without an enclosure according to an exemplary embodiment of the present disclosure.

FIG. 15 is a partially exploded, front perspective view of an electrical system without an enclosure according to an exemplary embodiment of the present disclosure. As shown in FIG. 15, a second cam 140 is connected to the push pull cable 101 (through the push pull cable 101's second end 103 by the connecting element 105). The second cam 140 is also connected to the first end 160 of the locking shaft 150. For example, the first end 160 of the locking shaft 150 is mounted on a side within the enclosure of the interlock mechanism of the electrical system, as shown in FIG. 15. Additionally and/or alternatively, the locking shaft 150 may be mounted to different locations within the enclosure 210 of the electrical system.

Figure 16:
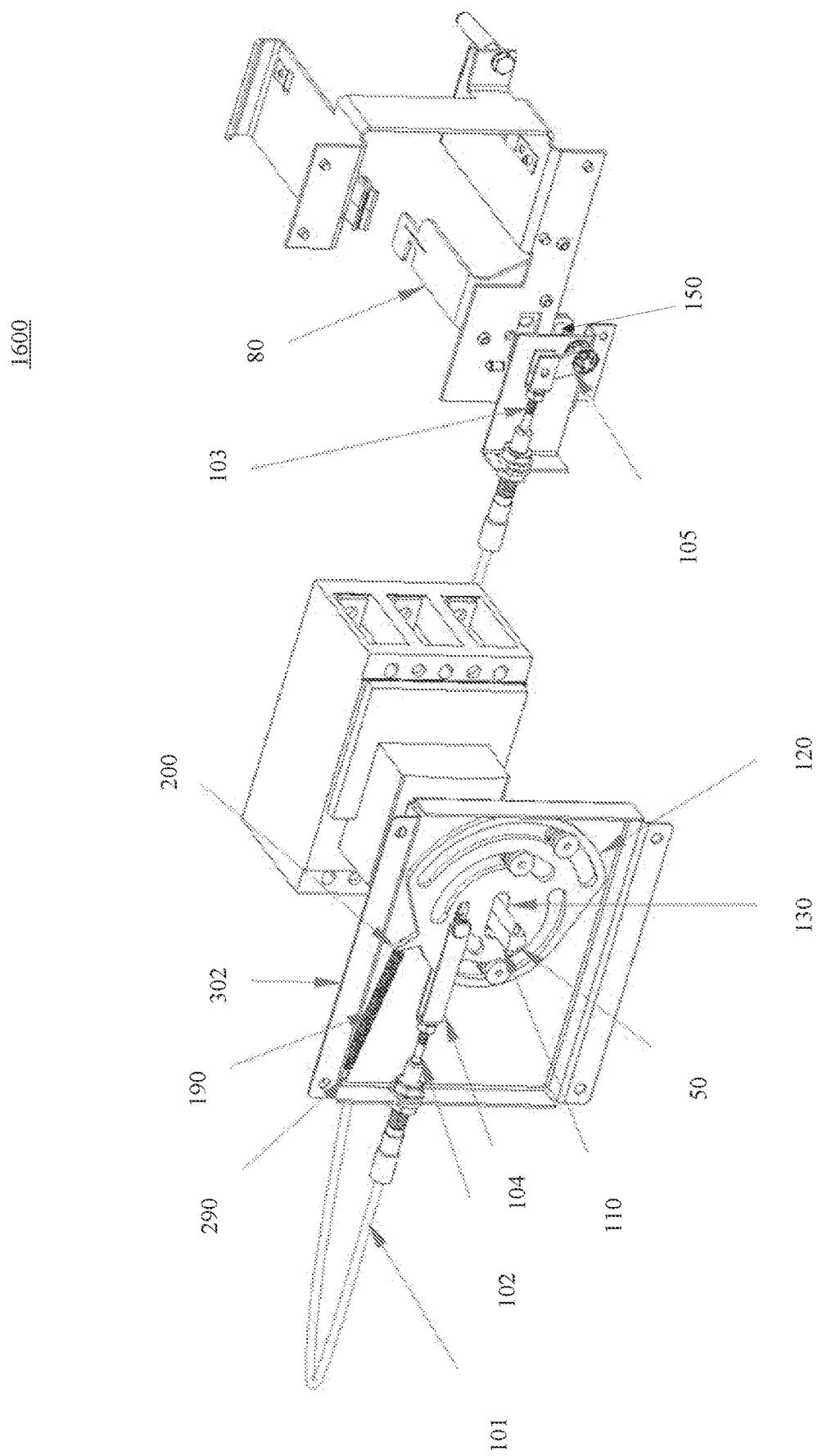
FIG. 16 is a partially exploded, front perspective view of an electrical system without an enclosure or a cover of the actuating mechanism according to an exemplary embodiment of the present disclosure.

FIG. 16 is a partially exploded, front perspective view of an electrical system without an enclosure or a cover of the actuating mechanism according to an exemplary embodiment of the present disclosure. As shown in FIG. 16, the position of the first end 50 of the shaft 40 may be regarded as the initial state of the busway tap-off device 10 of the electrical system that includes two shafts. That is, the busway tap-off device 10 is in the OFF (OPEN) position.

Figure 17:
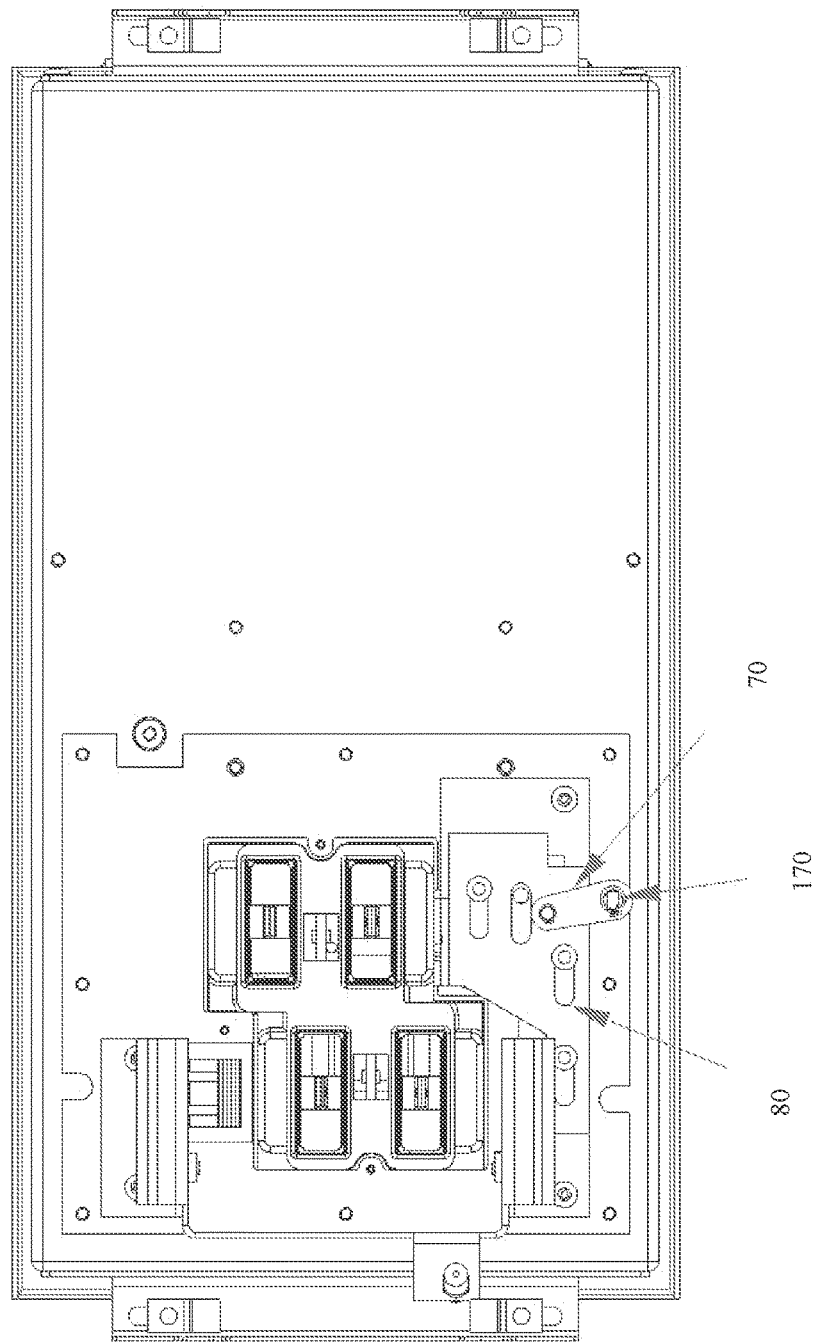
FIG. 17 is a rear view of a busway tap-off device of an electrical system in the OFF (OPEN) position according to an exemplary embodiment of the present disclosure.

FIG. 17 is rear view of a busway tap-off device of an electrical system in the OFF (OPEN) position according to an exemplary embodiment of the present disclosure. As shown in FIG. 17, the detailed connection of the second end 170 of the locking shaft 150, the interlock cam 70 of the locking shaft 150, and the interlock slider 80 of the interlock mechanism of the electrical system is depicted, when the busway tap-off device 10 of the electrical system is in the OFF (OPEN) position.

Figure 18:
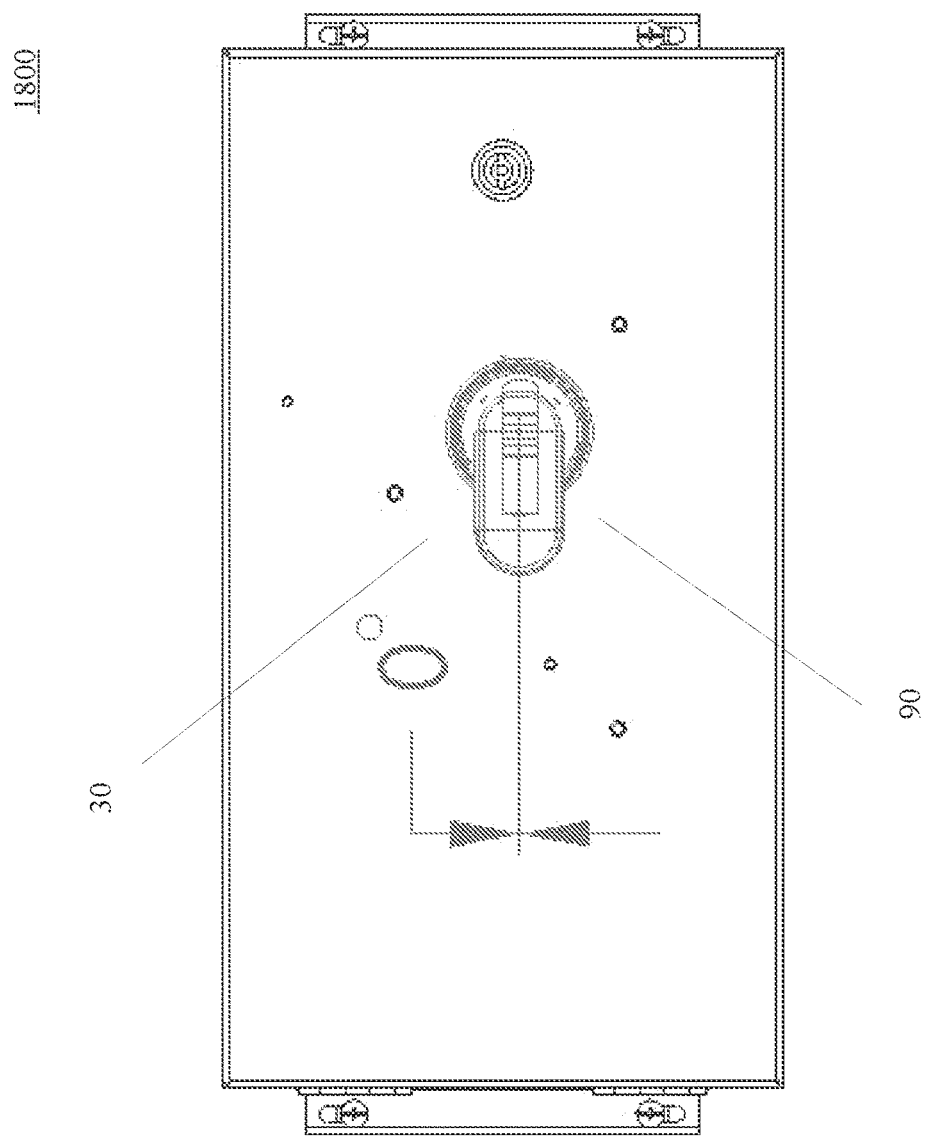
FIG. 18 is a front view of a busway tap-off device of an electrical system in the OFF (OPEN) position according to an exemplary embodiment of the present disclosure.

FIG. 18 is a front view of a busway tap-off device of an electrical system in the OFF (OPEN) position according to an exemplary embodiment of the present disclosure. A description of the position and movement of the handle 30 when the busway tap-off device 10 of the electrical system in the OFF (OPEN) position is provided above with reference to FIG. 6.

With reference to FIGS. 14-16, during a switching-off process, an operator of the electrical system may rotate the handle 30 in the counterclockwise direction by 90°, until the handle 30 reaches the first position 90, as shown in FIG. 18.

The shaft 40 rotates with the handle 30 accordingly, and turns the electrical device 20 to the OFF (OPEN) position. The shaft 40 also operates the cam 120 inside the actuating mechanism 180 by rotating the cam 120 to the first position 90, i.e., in the OFF (OPEN) position. This movement of the cam 120 returns the spring 190 back to its original state, i.e., not tensioned state.

Further, this movement of the cam 120 makes the push pull cable 101 push the second cam 140, which rotates the locking shaft 150 and the interlock cam 70 in the clockwise direction by 30°. The interlock cam 70, which is connected to the interlock slider 80 within the interlock mechanism, then moves the interlock slider 80 backwards and disengages an interlock through the interlock slider 80. In this situation, the interlock slider 80 is in the UNLOCKED position.

As such, the switching-off process for the electrical system with two shafts is completed. The busway tap-off device 10 can be removed from the busway and/or busway structure. Accordingly, the spring 190 is not tensioned until the electrical device 20 is put back in the ON (CLOSED) position.

Figure 19:
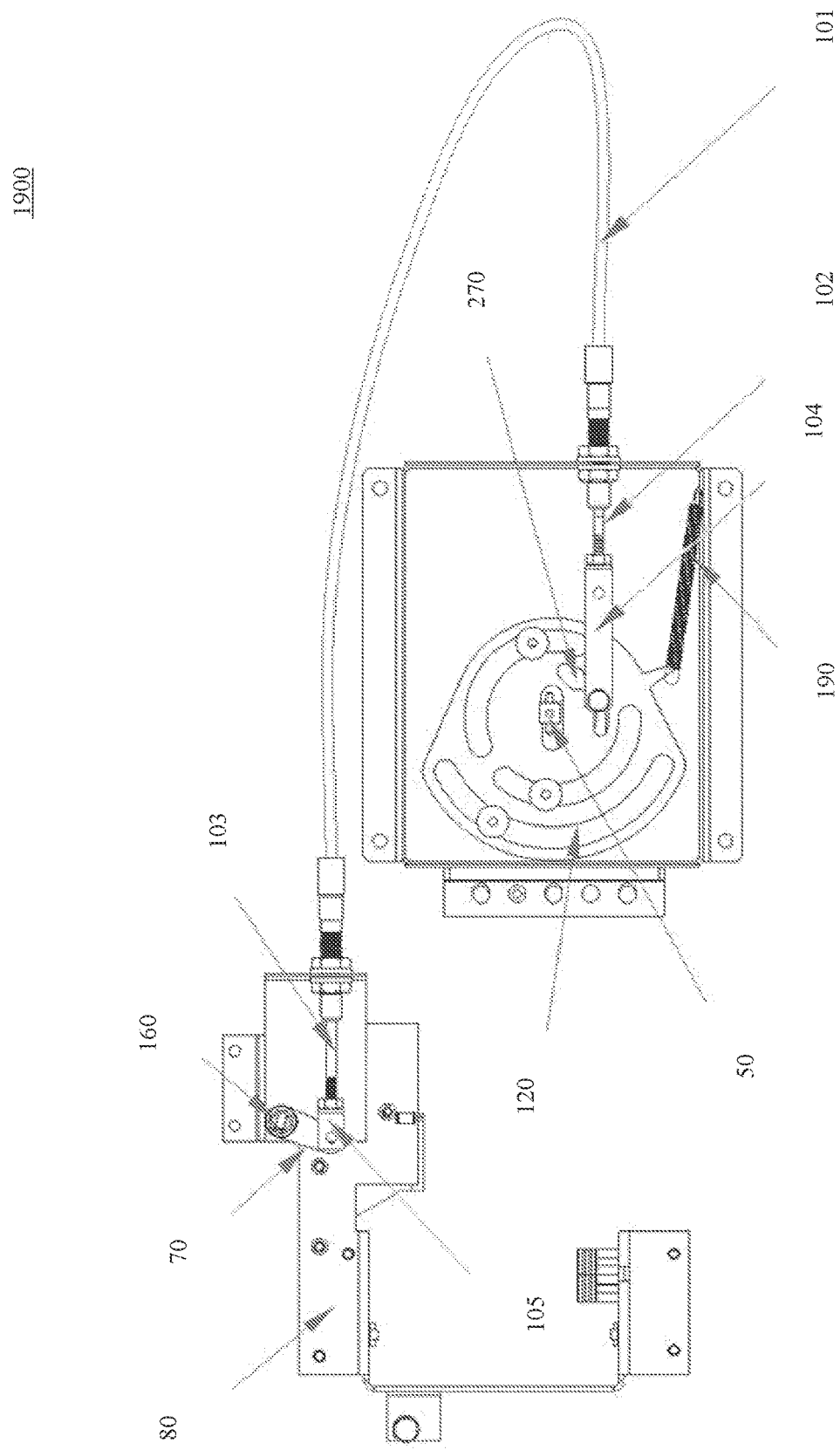
FIG. 19 is a front view of an actuating mechanism of an electrical system without a cover mounted on the busway tap-off device of the electrical system, with the tap-off device in the OFF (OPEN) position according to an exemplary embodiment of the present disclosure.

FIG. 19 is a front view of an actuating mechanism of an electrical system without a cover mounted on the busway tap-off device of the electrical system, with the tap-off device in the OFF (OPEN) position according to an exemplary embodiment of the present disclosure. As shown in FIG. 19, and with reference to FIG. 16, the first end 50 of the shaft 40 that passes through the opening 130 of the cam 120 is in a position in accordance to the handle 30's position, namely, the first position 90 as shown in FIG. 18.

Figure 20:
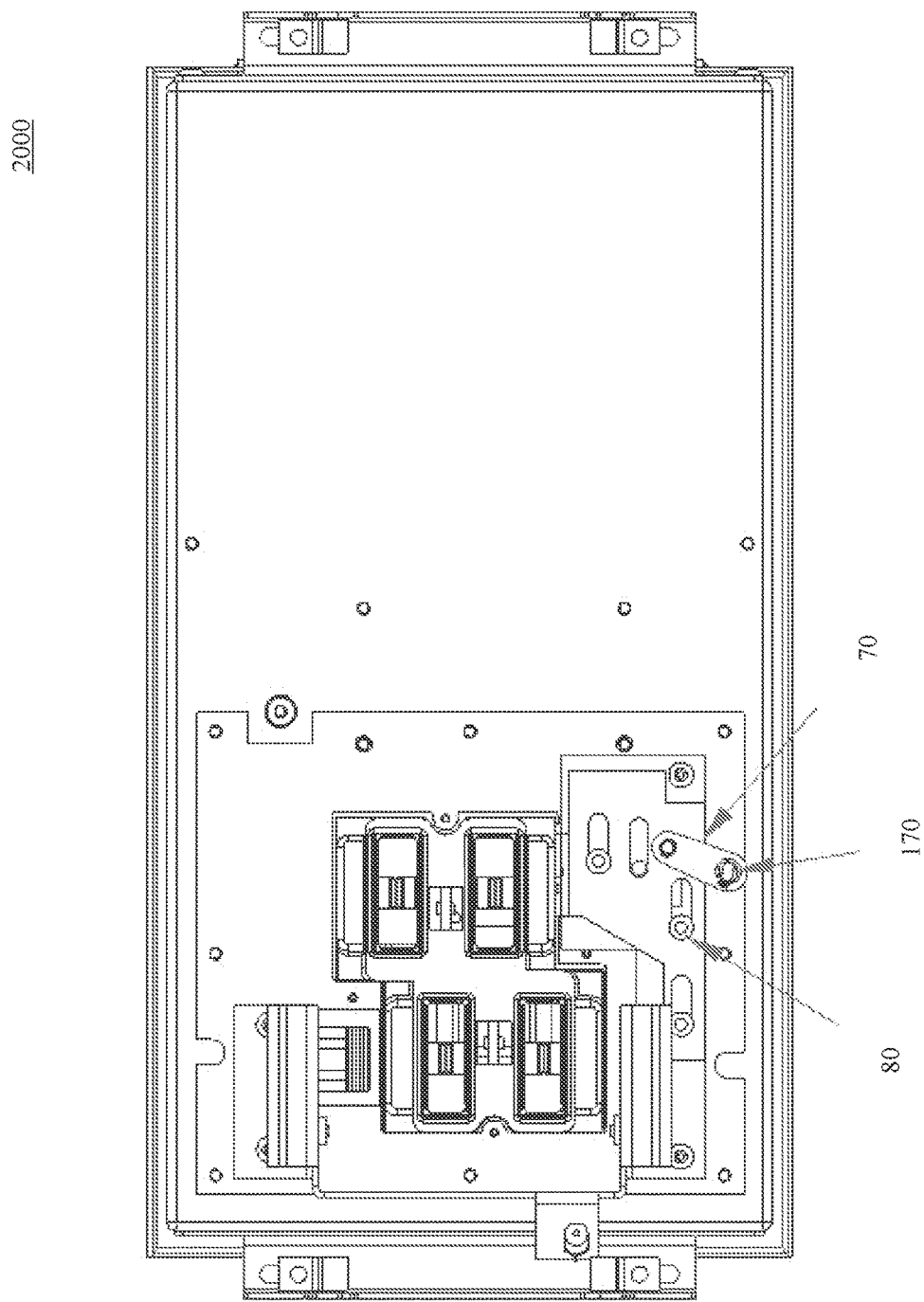
FIG. 20 is a rear view of a busway tap-off device of an electrical system in the ON (CLOSED) position according to an exemplary embodiment of the present disclosure.

FIG. 20 is a rear view of a busway tap-off device of an electrical system in the ON (CLOSED) position according to an exemplary embodiment of the present disclosure. As shown in FIG. 20, the detailed connection of the second end 170 of the locking shaft 150, the interlock cam 70 of the locking shaft 150, and the interlock slider 80 of the interlock mechanism of the electrical system is depicted, when the busway tap-off device 10 of the electrical system is in the ON (CLOSED) position.

Figure 21:
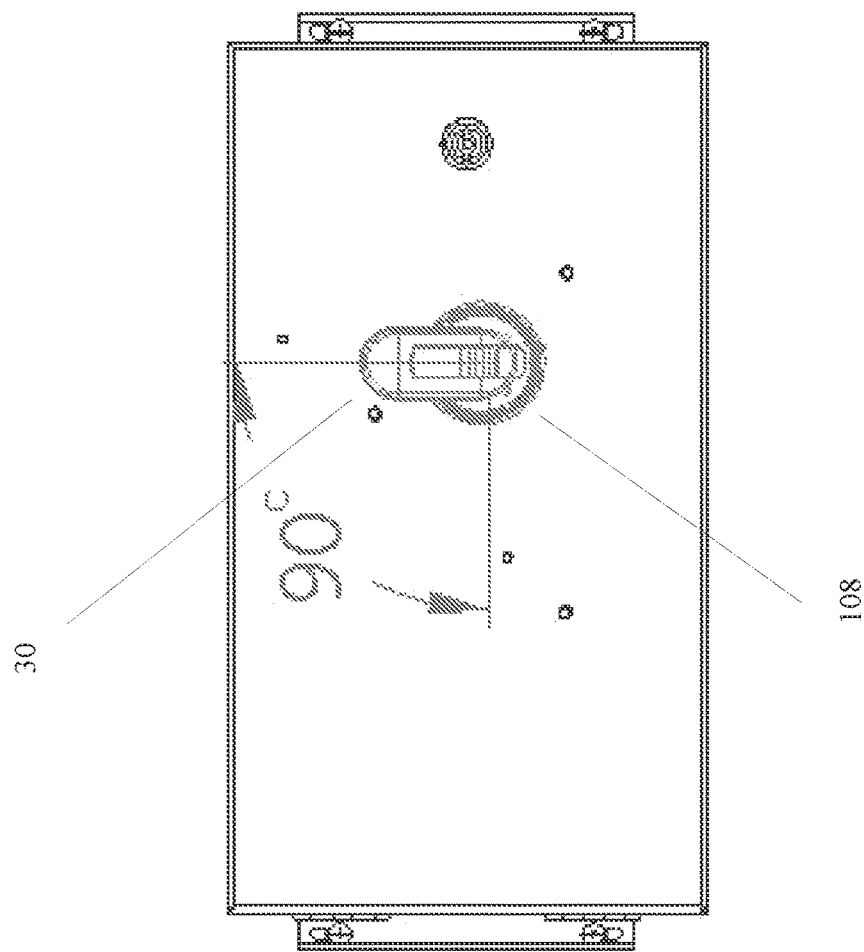
FIG. 21 is a front view of a busway tap-off device of an electrical system in the ON (CLOSED) position according to an exemplary embodiment of the present disclosure.

FIG. 21 is a front view of a busway tap-off device of an electrical system in the ON (CLOSED) position according to an exemplary embodiment of the present disclosure. A description of the position and movement of the handle 30 when the busway tap-off device 10 of the electrical system in the ON (CLOSED) position is provided above with reference to FIG. 9.

With reference to FIGS. 14-16, during a switching-on process, an operator of the electrical system rotates the handle 30 in the clockwise direction by 90°, until the handle 30 reaches the second position 108, i.e., in the ON (CLOSED) position, as shown in FIG. 21. The shaft 40 rotates with the handle 30 in the clockwise direction by 90° as well. Accordingly, the shaft 40 turns the electrical device 20 of the electrical system to the ON (CLOSED) position. The shaft 40 also operates the cam 120 inside the actuating mechanism 180 by rotating the cam 120 to the second position 108, i.e., in the ON (CLOSED) position. This movement of the cam 120 tensions the spring 190, i.e., putting the spring 190 in a tensioned state.

Further, this movement of the cam 120 causes a pulling force on the push pull cable 101. Accordingly, the push pull cable 101 pulls the connecting element 105, through which the second end 103 of the push pull cable 101 is connected to the second cam 140. The reciprocating movement of the connecting element 105 rotates the second cam 140. Accordingly, the rotation of the second cam 140 rotates the locking shaft 150 and the interlock cam 70 counterclockwise by 30°. Then, the interlock cam 70 translates the locking shaft 150's rotation into a linear movement of the interlock slider 80. Accordingly, the interlock slider 80 moves forward and interlocks with a slot on the busway and/or busway structure in the LOCKED position.

As such, the switching-on for the electrical system with two shafts is completed. In this situation, the busway tap-off device 10 cannot be removed from the busway and/or busway structure until the electrical device 20 is put back in the OFF (OPEN) position. As discussed above, the spring 190 remains tensioned until the electrical device 20 is put back in the OFF (OPEN) position, again.

Figure 22:
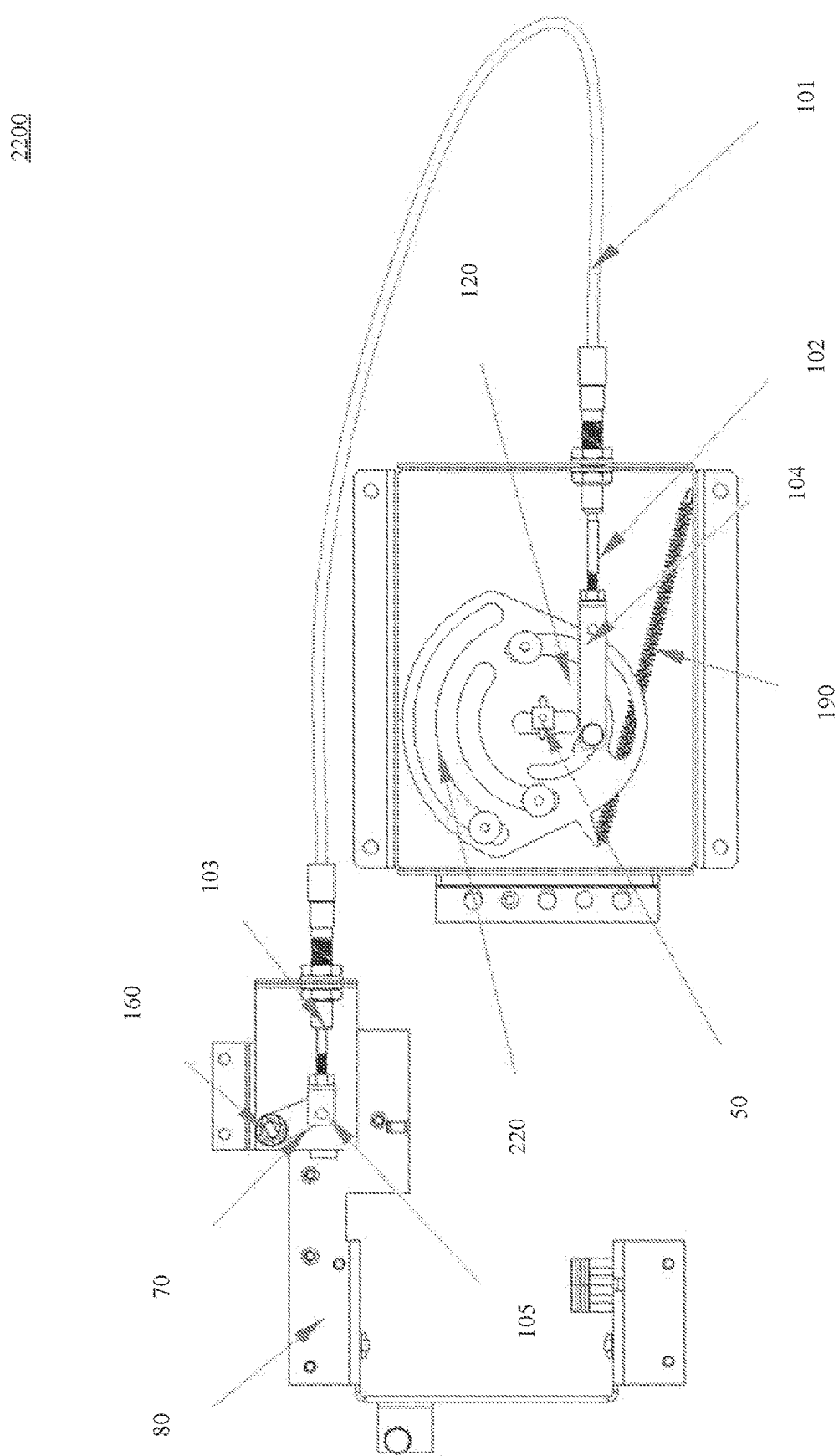
FIG. 22 is a front view of an actuating mechanism of an electrical system without a cover mounted on the busway tap-off device of the electrical system, with the tap-off device in the ON (CLOSED) position according to an exemplary embodiment of the present disclosure.

FIG. 22 is a front view of an actuating mechanism of an electrical system without a cover mounted on the busway tap-off device of the electrical system, with the tap-off device in the ON (CLOSED) position according to an exemplary embodiment of the present disclosure. As shown FIG. 22, and with reference to FIG. 16, the first end 50 of the shaft 40 that passes through the opening 130 of the cam 120 is in a position in accordance with the handle 30's position, namely, the second position 108 as shown in FIG. 21.

Figure 23:
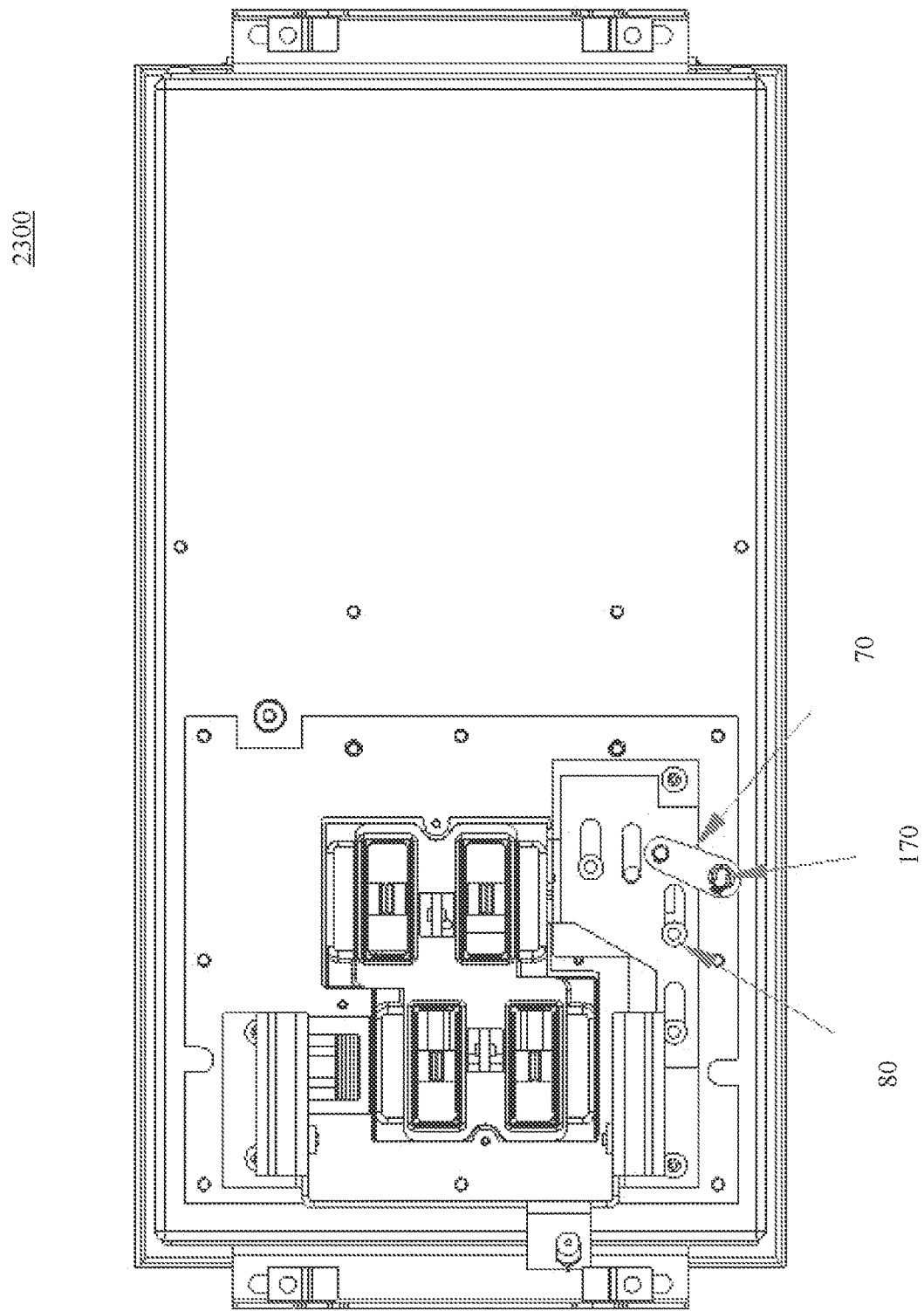
FIG. 23 is a rear view of a busway tap-off device of an electrical system in the TRIPPED position according to an exemplary embodiment of the present disclosure.

FIG. 23 is a rear view of a busway tap-off device of an electrical system in the TRIPPED position according to an exemplary embodiment of the present disclosure. As shown in FIG. 23, the detailed connection of the second end 170 of the locking shaft 150, the interlock cam 70 of the locking shaft 150, and the interlock slider 80 of the interlock mechanism of the electrical system is depicted, when the busway tap-off device 10 of the electrical system is in the TRIPPED position.

Figure 24:
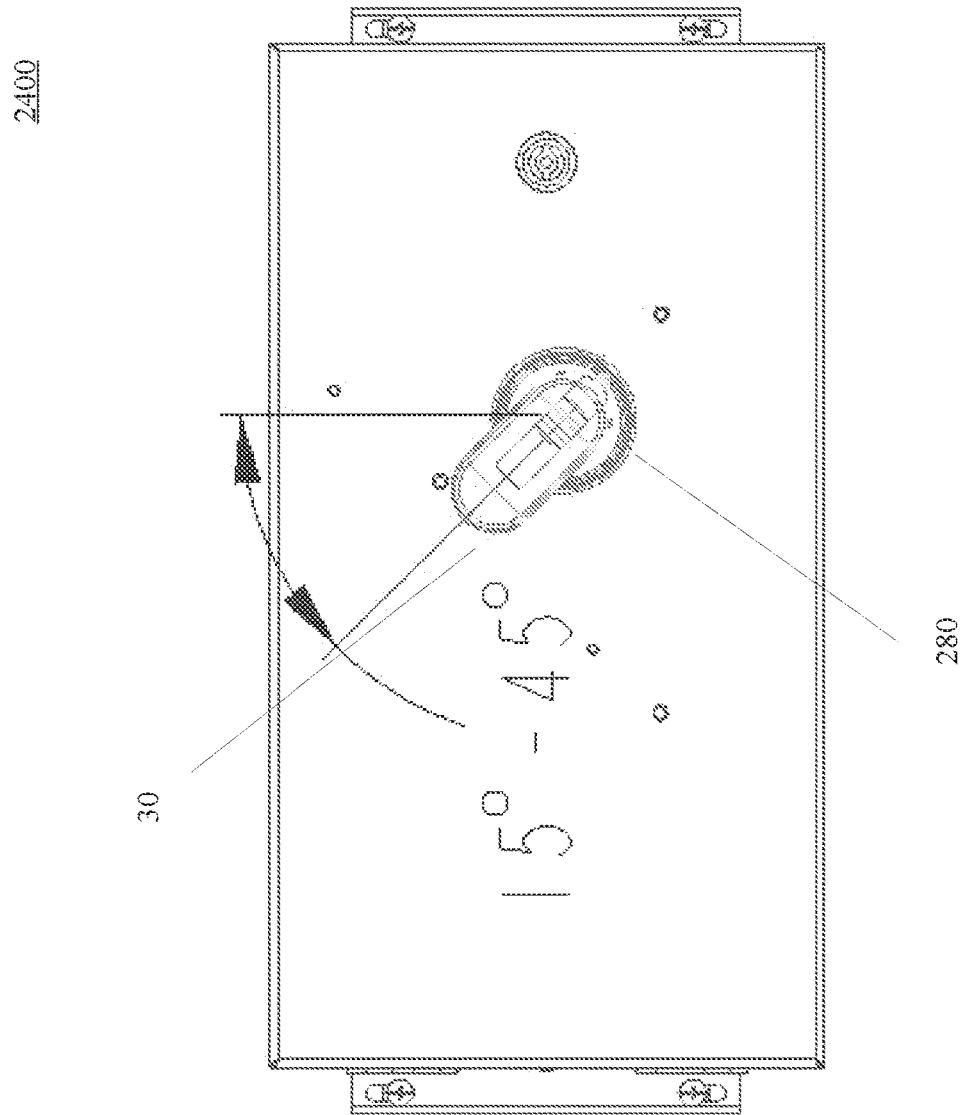
FIG. 24 is a front view of a busway tap-off device of an electrical system in the TRIPPED position according to an exemplary embodiment of the present disclosure.

FIG. 24 is a front view of a busway tap-off device of an electrical system in the TRIPPED position according to an exemplary embodiment of the present disclosure. A description of the position and movement of the handle 30 when the busway tap-off device 10 of the electrical system in the TRIPPED position is provided above with reference to FIG. 12.

With reference to FIGS. 14-16, the busway tap-off device 10 of the electrical system is triggered into the TRIPPED position from the ON (CLOSED) position when a short circuit and/or an overcurrent happens within the electrical system. In that situation, the handle 30 rotates counterclockwise by 15°-45°, until reaching the third position 280 (for example, from the second position 108 as shown in FIG. 21), i.e., in the TRIPPED position, as shown in FIG. 24. For example, the triggered movement of the busway tap-off device 10 will rotate the cam 120 inside the actuating mechanism 180, which then rotates the draft 40 as well as the handle 30. This movement of the cam 120 partially tensions the spring 190, i.e., putting the spring 190 in a partially tensioned state.

For example, the energy accumulated in the spring 190 fights friction in this situation. The accumulated energy in the spring 190 also ensures that the handle 30 rotates by up to a maximum angle, and further, the state of the electrical device 20 is clearly indicated, i.e., TRIPPED. The spring 190 remains partially tensioned until the electrical device 20 is put back in the OFF (OPEN) position.

Further, the rotation of the shaft 40 counterclockwise by 15°-45° away from the vertical axis does not cause any movement of the second cam 140 and the locking shaft 150. This is because the slot 270, for example, as shown in FIG. 19, is shaped to move the first end 102 of the push pull cable 101 when the electrical device 20 is switched ON or OFF.

However, the slot 270 is shaped not to move the first end 102 of the push pull cable 101 when the electrical device 20 is tripped.

As such, the process of triggering the busway tap-off device 10 in the TRIPPED position for the electrical system with two shafts is completed. In this situation, the electrical system provides a trip signalization, i.e., the electrical device 20 of the electrical system is tripped. As discussed above, the spring 190 remains partially tensioned.

Figure 25:
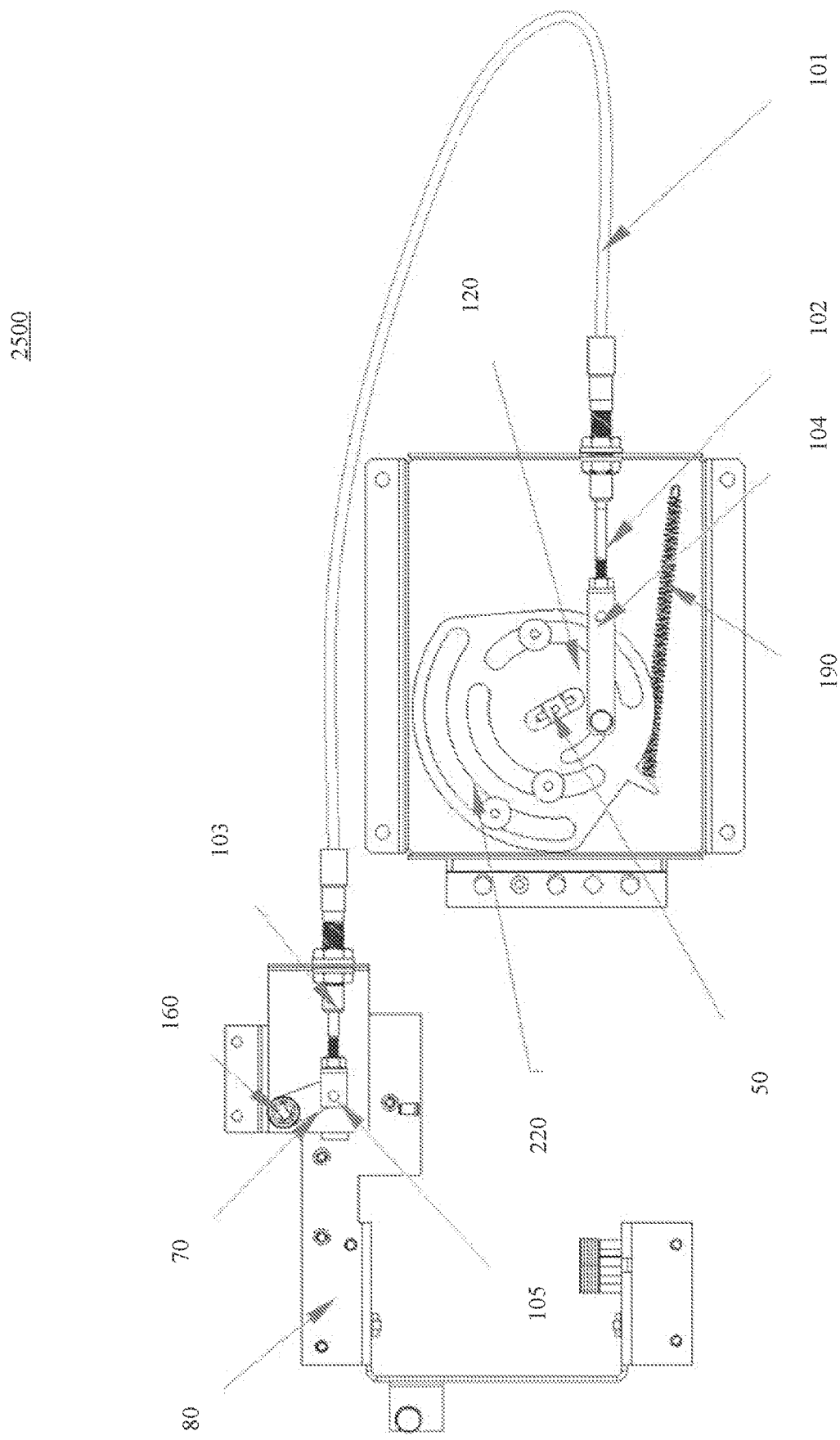
FIG. 25 is a front view of an actuating mechanism of an electrical system without a cover mounted on the busway tap-off device of the electrical system, with the tap-off device in the TRIPPED position according to an exemplary embodiment of the present disclosure.

FIG. 25 is a front view of an actuating mechanism of an electrical system without a cover mounted on the busway tap-off device of the electrical system, with the tap-off device in the TRIPPED position according to an exemplary embodiment of the present disclosure. As shown in FIG. 25, and with reference to FIG. 16, the first end 50 of the shaft 40 that passes through the opening 130 of the cam 120 is in a position in accordance with the handle 30's position, namely, the third position 280 as shown in FIG. 24.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of the present disclosure are described herein, including the best mode known to the inventors for carrying out the disclosure. Variations of those exemplary embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, the present disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An electrical system to operate an electrical device in an enclosure, comprising:
    an interlock mechanism, wherein the interlock mechanism comprises an interlock slider for selectively engaging the enclosure with a busway structure;
    an actuating system on a door of the enclosure, wherein the actuating system comprises a cam assembly that is configured to control the interlock mechanism; and
    a flexible mechanical interlock assembly that connects the cam assembly to the interlock mechanism, and
    wherein the flexible mechanical interlock assembly comprises a push pull cable having a first end and a second end, wherein the first end of the push pull cable is connected to the cam assembly through a first connecting element, and wherein the second end of the push pull cable is connected to the interlock mechanism through a second connecting element.

2. The electrical system of claim 1, wherein the electrical device in the enclosure comprises a first shaft extending from the electrical device, and the electrical device is configured to be operated by a rotation of the first shaft, and wherein the electrical system further comprises:
    a handle disposed outside the enclosure and coupled to the electrical device with the door of the enclosure closed, and
    wherein the handle is operative to rotate the first shaft to turn the electrical device on based on that the handle reaches an on position, or to turn the electrical device off based on that the handle reaches an off position.

3. The electrical system of claim 2, wherein the cam assembly of the actuating system comprises a first cam, and wherein the first cam is operable upon the rotation of the first shaft to displace the enclosure to engage with or disengage from the busway structure.

4. The electrical system of claim 3, wherein the first end of the push pull cable is connected to the first cam of the cam assembly through the first connecting element, and the second connecting element is connected to the interlock slider.

5. The electrical system of claim 4, wherein
    the push pull cable pulls the interlock slider to engage the enclosure with the busway structure based on that the handle rotates to the on position, and
    the push pull cable pushes the interlock slider to disengage the enclosure from the busway structure based on that the handle rotates to the off position.

6. The electrical system of claim 5, wherein
    the electrical device is tripped and the enclosure remains engaged with the busway structure based on that the handle rotates from the on position toward the off position, and stays between the on position and the off position.

7. The electrical system of claim 3, wherein the first end of the push pull cable is connected to the first cam of the cam assembly through the first connecting element, and
    wherein the flexible mechanical interlock assembly further comprises:
    a second cam;
    a second shaft having a first end and a second end; and
    an interlock cam that is connected to the interlock slider, and
    wherein the first end of the second shaft is connected to the second cam, and the second end of the second shaft is connected to the interlock cam, and
    wherein the second connecting element is connected to the second cam.

8. The electrical system of claim 7, wherein
the push pull cable pulls the second connecting element, which causes a rotation of the second cam, the second shaft and the interlock cam in a counterclockwise direction by 30°, and a linear movement of the interlock slider to engage the enclosure with the busway structure based on that the handle rotates in a clockwise direction by 90° and reaches the on position, and
the push pull cable pushes the second connecting element, which causes a rotation of the second cam, the second shaft and the interlock cam in a clockwise direction by 30°, and a linear movement of the interlock slider to disengage the enclosure from the busway structure based on that the handle rotates in a counterclockwise direction by 90° and reaches the off position.

9. The electrical system of claim 8, wherein
the electrical device is tripped and the enclosure remains engaged with the busway structure based on that the handle rotates from the on position toward the off position, and stays between the on position and the off position.

10. An electrical apparatus, comprising:
an enclosure, wherein the enclosure comprises a door for an access to an interior of the enclosure;
an electrical device, wherein the electrical device is located in the interior of the enclosure and comprises a first shaft extending therefrom, and wherein the electrical device is configured to be operated by a rotation of the first shaft;
a handle, wherein the handle is disposed outside the enclosure and coupled to the electrical device with the door of the enclosure closed, and wherein the handle is operative to rotate the first shaft to turn the electrical device on based on that the handle reaches an on position, or to turn the electrical device off based on that the handle reaches an off position;
an interlock mechanism, wherein the interlock mechanism comprises an interlock slider for selectively engaging the enclosure with a busway structure;
an actuating system on the door of the enclosure, wherein the actuating system comprises a cam assembly that is configured to control the interlock mechanism; and
a flexible mechanical interlock assembly that connects the cam assembly to the interlock mechanism, and
wherein the flexible mechanical interlock assembly comprises a push pull cable having a first end and a second end, wherein the first end of the push pull cable is connected to the cam assembly through a first connecting element, and wherein the second end of the push pull cable is connected to the interlock mechanism through a second connecting element.

11. The electrical apparatus of claim 10, wherein the cam assembly of the actuating system comprises a first cam, and wherein the first cam is operable upon the rotation of the first shaft to displace the enclosure to engage with or disengage from the busway structure.

12. The electrical apparatus of claim 11, wherein the first end of the push pull cable is connected to the first cam of the cam assembly through the first connecting element, and the second connecting element is connected to the interlock slider.

13. The electrical apparatus of claim 12, wherein
the push pull cable pulls the interlock slider to engage the enclosure with the busway structure based on that the handle rotates to the on position, and
the push pull cable pushes the interlock slider to disengage the enclosure from the busway structure based on that the handle rotates to the off position.

14. The electrical apparatus of claim 13, wherein
the electrical device is tripped and the enclosure remains engaged with the busway structure based on that the handle rotates from the on position toward the off position, and stays between the on position and the off position.

15. The electrical apparatus of claim 11, wherein the first end of the push pull cable is connected to the first cam of the cam assembly through the first connecting element, and
wherein the flexible mechanical interlock assembly further comprises:
a second cam;
a second shaft having a first end and a second end; and
an interlock cam that is connected to the interlock slider, and
wherein the first end of the second shaft is connected to the second cam, and the second end of the second shaft is connected to the interlock cam, and
wherein the second connecting element is connected to the second cam.

16. The electrical apparatus of claim 15, wherein
the push pull cable pulls the second connecting element, which causes a rotation of the second cam, the second shaft and the interlock cam in a counterclockwise direction by 30°, and a linear movement of the interlock slider to engage the enclosure with the busway structure based on that the handle rotates in a clockwise direction by 90° and reaches the on position, and
the push pull cable pushes the second connecting element, which causes a rotation of the second cam, the second shaft and the interlock cam in a clockwise direction by 30°, and a linear movement of the interlock slider to disengage the enclosure from the busway structure based on that the handle rotates in a counterclockwise direction by 90° and reaches the off position.

17. The electrical apparatus of claim 16, wherein
the electrical device is tripped and the enclosure remains engaged with the busway structure based on that the handle rotates from the on position toward the off position, and stays between the on position and the off position.

18. An electrical system, comprising:
an enclosure, wherein the enclosure comprises a door for an access to an interior of the enclosure;
an electrical device, wherein the electrical device is located in the interior of the enclosure and comprises a first shaft extending therefrom, and wherein the electrical device is configured to be operated by a rotation of the first shaft;
a handle, wherein the handle is disposed outside the enclosure and coupled to the electrical device with the door of the enclosure closed, and wherein the handle is operative to rotate the first shaft to turn the electrical device on based on that the handle reaches an on position, or to turn the electrical device off based on that the handle reaches an off position;
an interlock mechanism, wherein the interlock mechanism comprises an interlock slider for selectively engaging the enclosure with a busway structure;
an actuating system on the door of the enclosure, wherein the actuating system comprises a cam assembly that is configured to control the interlock mechanism; and
a flexible mechanical interlock assembly that connects the cam assembly to the interlock mechanism, and wherein the flexible mechanical interlock assembly comprises a push pull cable having a first end and a second end, wherein the first end of the push pull cable is connected to the cam assembly through a first connecting element, and wherein the second end of the push pull cable is connected to the interlock mechanism through a second connecting element.

19. The electrical system of claim 18, wherein the cam assembly of the actuating system comprises a first cam,
wherein the first cam is operable upon the rotation of the first shaft to displace the enclosure engage with or disengage from the busway structure, and
wherein the first end of the push pull cable is connected to the first cam of the cam assembly through the first connecting element, and wherein the second end of the push pull cable is directly or indirectly connected to the interlock slider of the interlock mechanism through the second connecting element.

20. The electrical system of claim 19, wherein
the push pull cable pulls the second connecting element to engage the enclosure with the busway structure based on that the handle rotates to the on position, and
the push pull cable pushes the second connecting element to disengage the enclosure from the busway structure based on that the handle rotates to the off position.

* * * * *